US00RE50625E

(19) United States
(12) Reissued Patent
McGinley et al.

(10) Patent Number: US RE50,625 E
(45) **Date of Reissued Patent: *Oct. 7, 2025**

(54) CHARGER PLUG WITH IMPROVED PACKAGE

(71) Applicant: Voltstar Technologies, Inc., Barrington, IL (US)

(72) Inventors: James W. McGinley, Barrington, IL (US); Donald Rimdzius, Naperville, IL (US); David P. Marcussen, Hortonville, WI (US)

(73) Assignee: Voltstar Technologies, Inc., Barrington, IL (US)

( * ) Notice: This patent is subject to a terminal disclaimer.

(21) Appl. No.: 17/467,221

(22) Filed: Sep. 5, 2021

Related U.S. Patent Documents

Reissue of:
(64) Patent No.: 9,024,581
Issued: May 5, 2015
Appl. No.: 12/124,515
Filed: May 21, 2008

U.S. Applications:
(63) Continuation of application No. 16/209,373, filed on Dec. 4, 2018, now Pat. No. Re. 48,794, which is an application for the reissue of Pat. No. 9,024,581.

(51) Int. Cl.
*H02J 7/00* (2006.01)
*H01R 31/06* (2006.01)
*H01R 13/24* (2006.01)

(52) U.S. Cl.
CPC ..... *H02J 7/0042* (2013.01); *H01R 31/065* (2013.01); *H01R 13/24* (2013.01)

(58) Field of Classification Search
CPC .... H02J 7/0042; H01R 13/24; H01R 31/0065
See application file for complete search history.

(56) References Cited

U.S. PATENT DOCUMENTS

| | | | |
|---|---|---|---|
| 5,243,510 | A | 9/1993 | Cheney, II |
| 5,401,178 | A | 3/1995 | Liu |
| 5,429,516 | A | 7/1995 | d'Alayer de Costemore d'Arc |
| 5,507,667 | A | 4/1996 | Hahn et al. |
| 5,580,268 | A | 12/1996 | Miyazawa |
| 5,681,188 | A | 10/1997 | Chiu |
| 5,744,934 | A | 4/1998 | Wu |

(Continued)

FOREIGN PATENT DOCUMENTS

| | | |
|---|---|---|
| CN | 2775860 Y | 4/2006 |
| CN | 1812208 | 8/2006 |

(Continued)

OTHER PUBLICATIONS

Declaration of John M. Tobias Pursuant to 37 C.F.R. 1.132, dated Jun. 12, 2012, in U.S. Appl. No. 12/124,515.

(Continued)

*Primary Examiner* — Linh M Nguyen
(74) *Attorney, Agent, or Firm* — David M. Quinlan, P.C.

(57) ABSTRACT

A reduced plug-size charger plug for power conversion is disclosed utilizing a pair of blades that are slidably mounted into a charger housing, obviating the need for insertion molding. To promote and maintain electrical contact while minimizing package size and charger plug cost, a pair of spring contacts are provided for electrically connecting the blades with internal circuitry.

22 Claims, 14 Drawing Sheets

(56) References Cited

U.S. PATENT DOCUMENTS

| | | | | |
|---|---|---|---|---|
| 5,777,868 | A | 7/1998 | Gibboney, Jr. | |
| 5,847,545 | A | 12/1998 | Chen et al. | |
| 5,896,278 | A | 4/1999 | Tamura et al. | |
| 6,091,611 | A | 7/2000 | Lanni et al. | |
| 6,160,728 | A | 12/2000 | Peterson et al. | |
| 6,172,884 | B1 | 1/2001 | Lanni et al. | |
| 6,262,901 | B1 | 7/2001 | Simopoulos | |
| 6,300,743 | B1 | 10/2001 | Patino et al. | |
| 6,386,921 | B1 | 5/2002 | Casari | |
| D458,217 | S | 6/2002 | Hawk | |
| D482,654 | S * | 11/2003 | Shor et al. | D13/110 |
| 6,643,158 | B2 | 11/2003 | McDonald et al. | |
| 6,643,599 | B1 * | 11/2003 | Mohr | G01N 3/42 702/41 |
| 6,644,984 | B2 * | 11/2003 | Vista et al. | 439/76.1 |
| 6,650,560 | B2 | 11/2003 | MacDonald et al. | |
| 6,664,758 | B2 | 12/2003 | Yang | |
| 6,696,825 | B2 | 2/2004 | Harris et al. | |
| 6,700,808 | B2 | 3/2004 | MacDonald et al. | |
| 6,747,859 | B2 * | 6/2004 | Walbeck et al. | 361/93.1 |
| 6,791,853 | B2 | 9/2004 | Afzal et al. | |
| 6,792,297 | B2 | 9/2004 | Cannon et al. | |
| 6,831,443 | B2 | 12/2004 | Liu | |
| 6,903,950 | B2 | 6/2005 | Afzal et al. | |
| 6,923,666 | B1 * | 8/2005 | Liao | 439/172 |
| 6,937,490 | B2 | 8/2005 | MacDonald et al. | |
| 7,019,997 | B2 | 3/2006 | Ooishi | |
| 7,020,500 | B2 * | 3/2006 | Saghbini | 455/571 |
| 7,101,226 | B1 * | 9/2006 | Gilliland | 439/620.01 |
| 7,134,887 | B1 | 11/2006 | Keely | |
| 7,164,255 | B2 | 1/2007 | Hui | |
| 7,170,258 | B2 * | 1/2007 | Sakai | 320/111 |
| 7,211,986 | B1 | 5/2007 | Flowerdew et al. | |
| 7,259,975 | B2 | 8/2007 | Holme Pdereson et al. | |
| D554,585 | S * | 11/2007 | Nazar | D13/110 |
| D583,316 | S | 12/2008 | Sade et al. | |
| 7,477,533 | B2 | 1/2009 | Gilliland | |
| D587,192 | S | 2/2009 | McGinley et al. | |
| D587,193 | S | 2/2009 | McGinley et al. | |
| 7,499,301 | B2 * | 3/2009 | Zhou | 363/146 |
| 7,504,815 | B2 | 3/2009 | Moyse et al. | |
| 7,511,452 | B2 | 3/2009 | Bersenev | |
| 7,573,159 | B1 | 8/2009 | Deluliis et al. | |
| 7,573,240 | B2 | 8/2009 | Spiridon | |
| 7,658,625 | B2 * | 2/2010 | Jubelirer et al. | 439/131 |
| D611,416 | S | 3/2010 | McGinley et al. | |
| 7,825,625 | B2 | 11/2010 | Posamentier | |
| 7,868,587 | B2 | 1/2011 | Stevens et al. | |
| 7,910,833 | B2 | 3/2011 | McGinley et al. | |
| 7,910,834 | B2 | 3/2011 | McGinley et al. | |
| 7,960,648 | B2 | 6/2011 | McGinley et al. | |
| 7,978,489 | B1 * | 7/2011 | Telefus et al. | 363/146 |
| 8,242,359 | B2 | 8/2012 | McGinley et al. | |
| 8,892,035 | B2 | 11/2014 | Mohammadian et al. | |
| 2003/0153200 | A1 * | 8/2003 | Vista, Jr. | H01R 12/58 439/76.1 |
| 2004/0204177 | A1 | 10/2004 | Pon | |
| 2004/0218411 | A1 | 11/2004 | Luu et al. | |
| 2005/0153588 | A1 * | 7/2005 | Liao | 439/172 |
| 2007/0069689 | A1 | 3/2007 | Shum | |
| 2007/0091656 | A1 * | 4/2007 | Navid et al. | 363/63 |
| 2007/0141894 | A1 | 6/2007 | McGinley et al. | |
| 2007/0145945 | A1 | 6/2007 | McGinley et al. | |
| 2007/0164704 | A1 | 7/2007 | McGinley et al. | |
| 2007/0298664 | A1 | 12/2007 | Tsai et al. | |
| 2008/0064244 | A1 | 3/2008 | Holland | |
| 2008/0085617 | A1 | 4/2008 | Bevirt | |
| 2008/0305693 | A1 | 12/2008 | Mei et al. | |
| 2009/0029581 | A1 | 1/2009 | Klant et al. | |
| 2009/0225486 | A1 | 9/2009 | Wadsworth | |
| 2009/0295233 | A1 | 12/2009 | McGinley et al. | |
| 2011/0254506 | A1 | 10/2011 | McGinley et al. | |
| 2011/0260555 | A1 | 10/2011 | McGinley et al. | |
| 2012/0062182 | A1 | 3/2012 | McGinley et al. | |
| 2013/0093381 | A1 | 4/2013 | McGinley et al. | |

FOREIGN PATENT DOCUMENTS

| | | | | |
|---|---|---|---|---|
| EP | 1746702 | | 1/2007 | |
| EP | 1978608 | A1 | 10/2008 | |
| JP | 3040642 | U | 8/1997 | |
| JP | H10162915 | A | 6/1998 | |
| JP | H112657679 | A | 9/1999 | |
| JP | 2002149285 | | 5/2002 | |
| JP | 2003203708 | | 7/2003 | |
| JP | 2007179802 | | 7/2007 | |
| JP | 200867532 | A | 3/2008 | |
| KR | 1020040076127 | A | 8/2004 | |
| KR | 200394114 | * | 8/2005 | H01R 24/58 |
| WO | 2007084426 | | 7/2007 | |
| WO | 2009146328 | | 12/2009 | |
| WO | 2010008698 | | 1/2010 | |

OTHER PUBLICATIONS

Declaration of James W. McGinley Pursuant to 37 C.F.R. 1.131 (with Exhibits 1-8), dated Jun. 12, 2012, in U.S. Appl. No. 12/124,515.

Declaration of John M. Tobias Pursuant to 37 C.F.R. 1.132 (with Exhibits A-I) , dated Dec. 11, 2012, in U.S. Appl. No. 12/124,515.

Declaration of James W. McGinley Pursuant to 37 C.F.R. 1.131 (with Exhibits J-Q), dated Dec. 12, 2012, in U.S. Appl. No. 12/124,515.

Advisory Action dated Jan. 11, 2013, in U.S. Appl. No. 12/124,515.

Decision on Appeal dated Mar. 2, 2015, in U.S. Appl. No. 12/124,515.

Docket Sheet in *Voltstar Technologies, Inc.* v. *AT&T, Inc., et al.*, Case No. 2:12-cv-00082-JRG (E.D. Tex.), as of Dec. 3, 2018.

Docket Sheet in *Voltstar Technologies, Inc.* v. *Superior Comm., Inc., et al.*, Case No. 2:13-cv-00097-JRG (E.D. Tex.), as of Dec. 3, 2018.

Docket Sheet in *Voltstar Technologies, Inc.* v. *Amazon.Com, Inc.*, Case No. 1-13-cv-05570 (N.D. III.), as of Dec. 3, 2018.

Docket Sheet in *Voltstar Technologies, Inc.* v. *Office Depot, Inc.*, Case No. 9:15-cv-81190-RLR (S.D. Fla.), as of Dec. 3, 2018.

Docket Sheet in *Voltstar Technologies, Inc.* v. *L & L Wings, Inc.*, Case No. 9:15-cv-81758-JIC (S.D. Fla.), as of Dec. 3, 2018.

Docket Sheet in *Voltstar Technologies, Inc.* v. *AT&T Mobility, Inc. et al.*, Case No. 2:16-cv-01181-JRG (E.D. Tex.), as of Dec. 3, 2018.

Docket Sheet in *Voltstar Technologies, Inc.* v. *Kanex, Inc., et al.*, Case No. 2:16-cv-03058-R-JEM (C.D. Cal.), as of Dec. 3, 2018.

Docket Sheet in *Voltstar Technologies, Inc.* v. *Biz to Biz Direct, Inc.*, Case No. 9-16-cv-80009-BB (S.D. Fla.), as of Dec. 3, 2018.

Docket Sheet in *Voltstar Technologies, Inc.* v. *Newslink of Miami, LLC, et al.*, Case No. 9:16-cv-80063-RLR (S.D. Fla.), as of Dec. 3, 2018.

Defendant Office Depot Inc.'s Amended Preliminary Invalidity Contentions (with Tables I to IX), dated Mar. 16, 2016, In *Voltstar Technologies, Inc.* v. *Office Depot, Inc.*, Case No. 9:15-cv-81190 (Rosenberg/Brannon), S.D. Fla.

Universal Serial Bus Specification, Revision 2.0, Apr. 27, 2000.

Navas, J., et al., "Miniaturized Battery Charger using Piezoelectric Transformers," 16th Annual IEEE Applied Power Electronics Conference and Exhibition, vol. 2, pp. 492-496, The Institute of Electrical and Electronics Engineers, Inc., 2001.

UL 498—Attachment Plugs and Receptacles, Dec. 26, 2001, Underwriters Laboratories Inc.

Choi, S., et al., "Design of Half-Bridge Piezo-Transformer Converters in the AC Adapter Applications," Applied Power Electronics Conference and Exposition, 2005, vol. 1, pp. 244-248, The Institute of Electrical and Electronics Engineers, Inc.

IPod User's Guide, 2005, Apple, Inc.

IPod USB Power Adapter, 2006, Apple, Inc.

Loyola, Roman, "Review: iPod Power Adapters," Macworld, Apr. 28, 2008, http://www.macworld.com/article/11330000/ipod_power_adapters.html.

TinyPlug Technology (Shenzhen) Limited, "iPod Travel Power Charger/Adapter" Mar. 7, 2007, pp. 1-3, http://tinyplug.manufacturer_globalsources.com/si/6008822397297/pdtl/iPod-accessory.

www.igo.com, printed Apr. 18, 2008.

www.apple.com, "Apple USB Power Adapter," printed Apr. 24, 2008.

(56) References Cited

OTHER PUBLICATIONS

Sabate, J., et al., "Cell-Phone Battery Charger Miniaturization," pp. 3036-3043, IEEE (2000).
"IGo Wall-Universal Wall (AC) Power Adapter," Mobility Electronics, Inc. Data Sheet, © 2002-2006.
"Clipper Gear SIM Saver Backup and Copy Unit for GSM Cell Phones," (Data Sheet), May 8, 2006.
Hypercel, Inc., mini chargers, Mar. 11, 2005.
Complaint for Patent Infringement (Injunctive Relief Demanded), *Voltstar Technologies, Inc.* v. *Big Lots Stores, Inc.*, Southern District of Florida, Case No. 9:22-cv-80530-AMC, Apr. 1, 2022.
Big Lots Stores, Inc.'s Answer, Affirmative Defenses, and Counterclaims to Plaintiff's Complaint, *Voltstar Technologies, Inc.* v. *Big Lots Stores, Inc.*, Southern District of Florida, Case No. 9:22-cv-80530-AMC, Jun. 7, 2022.
Complaint for Patent Infringement (Injunctive Relief Demanded), *Voltstar Technologies, Inc.* v. *Aldi Inc.*, Southern District of Florida, Case No. 9:22-cv-80588-AMC, Apr. 15, 2022.
Defendant Aldi, Inc.'s Answer, Affirmative Defenses and Defenses, *Voltstar Technologies, Inc.* v. *Aldi Inc.*, Southern District of Florida, Case No. 9:22-cv-80588-AMC, Jun. 27, 2022.
Complaint for Patent Infringement (Injunctive Relief Demanded), *Voltstar Technologies, Inc.* v. *Home Depot U.S.A., Inc.*, Southern District of Florida, Case No. 9:22-cv-80711-AMC, May 10, 2022.
Home Depot U.S.A., Inc.'s Answer to Complaint, *Voltstar Technologies, Inc.* v. *Home Depot U.S.A., Inc.*, Southern District of Florida, Case No. 9:22-cv-80711-AMC, Jul. 8, 2022.
Complaint for Patent Infringement, *Voltstar Technologies, Inc.* v. *Brands Mart U.S.A., Inc.*, Southern District of Florida, Case No. 0:22-cv-60926-WPD, May 16, 2022.
Defendant Brands Mart U.S.A.'s Answer to Amended Complaint and Counterclaim: Demand for Jury Trial, *Voltstar Technologies, Inc.* v. *Brands Mart U.S.A., Inc.*, Southern District of Florida, Case No. 0:22-cv-60926-WPD, Sep. 13, 2022.
First Amended Complaint for Patent Infringement, *Voltstar Technologies, Inc.* v. *Lowe's Home Centers, LLC*, Southern District of Florida, Case No. 9:22-cv-80574-AMC, Jun. 7, 2022.
Lowe's Home Centers, LLC Answer to First Amended Complaint, Affirmative Defenses and Counterclaims, *Voltstar Technologies, Inc.* v. *Lowe's Home Centers, LLC*, Southern District of Florida, Case No. 9:22-cv-80574-AMC, Jun. 21, 2022.
First Amended Complaint for Patent Infringement, *Voltstar Technologies, Inc.* v. *Publix Super Markets, Inc.* Southern District of Florida, Case No. 9:22-cv-80617-AMC, Jun. 16, 2022.
Defendant Publix Super Markets, Inc.'s Answer to Plaintiff's First Amended Complaint, *Voltstar Technologies, Inc.* v. *Publix Super Markets, Inc.* Southern District of Florida, Case No. 9:22-cv-80617-AMC, Jun. 30, 2022.
Complaint for Patent Infringement, *Voltstar Technologies, Inc.* v. *Walmart Inc.*, Southern District of Florida, Case No. 9:22-cv-81679-DMM, Oct. 31, 2022.
Walmart Inc.'s Answer and Affirmative Defenses, *Voltstar Technologies, Inc.* v. *Walmart Inc.*, Southern District of Florida, Case No. 9:22-cv-81679-DMM, Dec. 11, 2022.
Complaint for Patent Infringement, *Voltstar Technologies, Inc.* v. *Best Buy Co., Inc and BBY Solutions, Inc.*, Southern District of Florida, Case No. 1:22-cv-23995-DPG, Dec. 8, 2022.
Defendant's Answer to Complaint and Demand for Jury Trial, *Voltstar Technologies, Inc.* v. *Best Buy Co., Inc and BBY Solutions, Inc.*, Southern District of Florida, Case No. 1:22-cv-23995-DPG, Feb. 10, 2023.
Complaint for Patent Infringement (Injunctive Relief Demanded), *Voltstar Technologies, Inc.* v. *Staples, Inc.*, Southern District of Florida, Fort Lauderdale Division, Case No. 22-cv-60683-CANNON/Valle, Apr. 6, 2022.
Staples, Inc's Answer to Complaint, Affirmative Defenses and Counterclaims, *Voltstar Technologies, Inc.* v. *Staples, Inc.*, Southern District of Florida, Fort Lauderdale Division, Case No. 22-cv-60683-CANNON/Valle, May 13, 2022.
Frakes, D., Apple iPod USB Power Adaptor (Late 2006), Macworld, Oct. 4, 2006.
Scosche IP2IN1 iPhone and iPod charger, Jun. 2006.
Complaint for Patent Infringement, *Voltstar Technologies, Inc.* v. *Craig Electronics LLC and Newtech Electronic Industries LLC*, Southern District of Florida, Case No. 1:23-cv-22284, Jun. 20, 2023.
Defendant Newtech Electronics Industries LLC's Answer, Affirmative Defenses, Counterclaim and Demand for Jury Trial, *Voltstar Technologies, Inc.* v. *Craig Electronics LLC and Newtech Electronic Industries LLC*, Southern District of Florida, Case No. 1:23-cv-22284, Aug. 14, 2023.
Complaint For Patent Infringement, *Voltstar Technologies, Inc.* v. *Fantasia Trading LLC, Anker Innovations Co., Limited, and Anker Technology Corporation*, Western District of Washington, Case No. 2:23-cv-01003, Jul. 6, 2023.
Answer to Complaint for Patent Infringement, *Voltstar Technologies, Inc.* v. *Fantasia Trading LLC, Anker Innovations Co., Limited, and Anker Technology Corporation*, Western District of Washington, Case No. 2:23-cv-01003, Dec. 13, 2023.
Complaint for Patent Infringement, *Voltstar Technologies Inc.* v. *Otter Products, LLC*, District of Colorado, Case No. 1:23-cv-02669, Oct. 12, 2023.
Answer and Counterclaims of Otter Products, LLC, *Voltstar Technologies Inc.* v. *Otter Products, LLC*, District of Colorado, Case No. 1:23-cv-02669, Nov. 29, 2023.
Complaint for Patent Infringement, *Voltstar Technologies Inc.*, v. *Motorola Mobility LLC*, Southern District of Florida, Case No. 0:23-cv-61959, Oct. 13, 2023.
Defendant Motorola Mobility LLC's Answer, Affirmative Defenses, and Counterclaims, *Voltstar Technologies Inc.*, v. *Motorola Mobility LLC*, Southern District of Florida, Case No. 0:23-cv-61959, Dec. 15, 2023.
Complaint for Patent Infringement, *Voltstar Technologies, Inc.* v. *Spigen, Inc.*, Central District of California, Case No. 8:23-cv-02101, Nov. 8, 2023.
Spigen Inc.'s Answer, Affirmative Defenses, and Counterclaims to Plaintiff's Complaint, *Voltstar Technologies, Inc.* v. *Spigen, Inc.*, Central District of California, Case No. 8:23-cv-02101, Jan. 29, 2024.
Complaint for Patent Infringement, *Voltstar Technologies, Inc.* v. *Nimble for Good, PBC dba Nimble for Good*, Central District of California, Case No. 8:23-cv-02098, Nov. 8, 2023.
Nimble For Good, PBC dba Nimble for Good's Answer, Affirmative Defenses, and Counterclaims to Plaintiff's Complaint, *Voltstar Technologies, Inc.* v. *Nimble for Good, PBC dba Nimble for Good*, Central District of California, Case No. 8:23-cv-02098, Jan. 5, 2024.
Complaint for Patent Infringement, *Voltstar Technologies, Inc.* v. *Salom America Company*, Northern District of Illinois, Case No. 1:24-cv-03242, Apr. 23, 2024.
Salom America Company's Answer, Affirmative Defenses, and Counterclaims to Plaintiff's Complaint for Patent Infringement, *Voltstar Technologies, Inc.* v. *Salom America Company*, Northern District of Illinois, Case No. 1:24-cv-03242, May 16, 2024.
Defendant Salom America Company's LPR 2.3 Initial Non-Infringement, Unenforceability, and Invalidity Contentions, Sep. 25, 2024, in *Voltstar Technologies, Inc.* v. *Salom America Company*, Northern District of Illinois, Case No. 1:24-cv-03242, Apr. 23, 2024.
Exhibit A1, Invalidity of Reissued U.S. Pat. No. Re. 48,794 in View of Chinese Patent Publication No. CN 1812208A, Sep. 25, 2024.
Exhibit A2, Invalidity of Reissued U.S. Pat. No. Re. 48,794 in View of Japanese Patent Publication No. JPH11265769A, Sep. 25, 2024.
Exhibit A3, Invalidity of Reissued U.S. Pat. No. Re. 48,794 in View of U.S. Patent Publication No. 2008/0305693, Sep. 25, 2024.
Exhibit A4, Invalidity of Reissued U.S. Pat. No. Re. 48,794 in View of U.S. Pat. No. 5,429,516, Sep. 25, 2024.
Exhibit A5, Invalidity of Reissued U.S. Pat. No. Re. 48,794 in Emtc, Inc.'s AC to USB Power Adapter Charger.
Exhibit A6, Invalidity of Reissued U.S. Pat. No. Re. 48,794 in View of U.S. Patent Publication No. 2007/0298664.

(56) References Cited

OTHER PUBLICATIONS

Exhibit A7, Invalidity of Reissued U.S. Pat. No. Re. 48,794 in View of U.S. Patent Publication No. 2008/0064244.
Exhibit A8, Invalidity of Reissued U.S. Pat. No. Re. 48,794 in View of Japanese Patent Publication No. JP2008067532A.
Exhibit A9, Invalidity of Reissued U.S. Pat. No. Re. 48,794 in View of U.S. Patent Publication No. 2004/0218411, Sep. 25, 2024.
Exhibit A10, Invalidity of Reissued U.S. Pat. No. Re. 48,794 in View of U.S. Pat. No. 5,847,545, Sep. 25, 2024.
Exhibit A11, Invalidity of Reissued U.S. Pat. No. Re. 48,794 in View of U.S. Pat. No. 5,847,545, Sep. 25, 2024.
Exhibit A12, Invalidity of Reissued U.S. Pat. No. Re. 48,794 in View of U.S. Pat. No. 5,847,545, Sep. 25, 2024.
Exhibit A13, Invalidity of Reissued U.S. Pat. No. Re. 48,794 in View of U.S. Pub. App. 20090225486, Sep. 25, 2024.
Exhibit A14, Invalidity of Reissued U.S. Pat. No. Re. 48,794 in View of U.S. Pat. No. 5,243,510, Sep. 25, 2024.
Exhibit A15, Invalidity of Reissued U.S. Pat. No. Re. 48,794 in View of EP1978608, Sep. 25, 2024.
Emtc, Inc. AC to USB Power Adapter Charger, Apr. 26, 2008.
Complaint, *Voltstar Technologies, Inc.* v. *Samsung Electronics America, Inc.*, Eastern District of Texas, Case No. 4:24-cv-00668, Jul. 23, 2024.
Defendant Samsung Electronics America, Inc.'s Answer and Affirmative Defenses to Plaintiff's Complaint for Patent Infringement, Eastern District of Texas, Case No. 4:24-cv-00668, Oct. 7, 2024.
Complaint for Patent Infringement, *Voltstar Technologies, Inc.* v. *Belkin International, Inc.*, Central District of California, Case 2:24-cv-08737, Oct. 10, 2024.
Belkin International Inc.'s Answer and Defenses to Plaintiff's Complaint for Patent Infringement, *Voltstar Technologies, Inc.* v. *Belkin International, Inc.*, Central District of California, Case 2:24-cv-08737, Nov. 12, 2024.
Ultra-Slimline Mini USB Device Charger USL-MU-100; Horizon Technologies, Inc. Data Sheet.
Go Forward Enterprise Corp., Product Presentation (Data Sheet 1998).
Egston GmbH AC adapter (published 1995).
Apple iPod Power Adapter © 2003.
Apple IPod USB Power Adapter © 2007.

* cited by examiner

CHARGER PLUG WITH IMPROVED PACKAGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 9,024,581. The reissue applications are application Ser. No. 17/467,221 (the present application) and application Ser. No. 16/209,373, now U.S. RE 48,794. Application Ser. No. 17/467,221 is a continuation reissue of application Ser. No. 16/209,373.*

FIELD OF THE INVENTION

The invention relates to charger plugs and, in particular, to a plug for electronic devices, and, more particularly, a power converting plug for portable electronic devices, the plug having an improved package by simplifying the construction and reducing the size of the package.

BACKGROUND

Currently, portable electronics and other devices are provided electric energy via a plug provided with prongs or blades that are inserted into a power outlet. Often, the plug provides some type of power conversion or conditioning, etc., so that the power delivered to the electronic device is in a state that is usable by the electronic device. Most particularly, the plug acts as a converter so that power received from the plug of a certain voltage, as well as preferably a certain current type (i.e., alternating current or direct current) is transmitted to the electronic device with a pre-determined voltage and current type. Towards this end, the plug may receive, e.g., 120 VAC and supply a stepped-down voltage as a direct current, such as 5-20 VDC. The plug, as described, is thus a converter plug and, for electronic devices that are portable and chargeable, the plug is commonly referred to as an ac adapter or charger plug. In order to effect such power conversion, the plug includes internal circuit components, the components then being electrically connected to a power coupling such as a cord that extends from the plug.

There are significant issues with such plugs, such as the size of the plug. Efforts to reduce the plug vertical and lateral dimensions are well-known so that, when the plug prongs are inserted into a power receptacle or outlet or power strip (a power source), the plug itself provides little or no interference with use of an adjacent receptacle. Often times, however, plug designs having reduced vertical and lateral dimensions require an increased plug length (i.e., the dimension of the plug aligned with the direction of the plug prongs). This increased length may hinder the ability of a user to locate the plug in an outlet that is behind, for instance, a furniture item, and may require the plug to protrude in a manner that makes the plug susceptible to being struck, that makes the plug susceptible to backing out of the receptacle due to the torque provided by its own weight, or that makes the plug simply unsightly.

Another issue with such plugs is cost, which is typically a two-fold problem. One aspect of the problem is that packaging material costs for a larger plug are simply greater than for a smaller plug.

The other aspect of the problem is the cost of manufacturing and assembling the plug. In many prior art plugs, the blades (including the prongs receivable in the outlet) are insert molded, which is a relatively expensive process and requires approximately 20 seconds of mold time. To be more specific, the process requires the blades to be positioned in proper registry within a mold cavity. The mold then receives the material for a plug housing in a flowable state (such as by transfer or injection molding, as examples). The material then cools and hardens so that the blades and housing portions can be removed. Because the temperature of the metal blades is elevated, the molding must be cooled sufficiently that the blades do not cause creep in the thermoplastic creep material, which requires time. Nonetheless, errors do result from improper positioning or inadvertent movement of the blades during the molding process, which results in production waste, at least in terms of time and effort.

After the blades are insert molded, they must be joined with the internal circuitry of the plug, that is, the circuitry that provides the power conversion. In most prior art plugs, this requires hand soldering within the plug housing to join connections on the blades with either wires leading to the circuitry or with contacts directly located on the circuitry, such as a printed circuit board (PCB). This process is manually performed and requires patience and care, which translates to labor and time. This process can also result in errors as it is difficult to avoid contact of a solder iron or other implement from contacting the plastic housing (resulting in damage thereto), and as it is difficult to immediately recognize improper solder joints. Additionally, it is difficult to test the plug device for proper operation until after the blades are soldered/secured with the circuitry, at which point removal of defective components is labor intensive.

It should also be noted that use of solder and hookup wire requires packaging space. That is, utilizing solder and hookup wire for electrically connecting the blades to the circuitry requires a minimum solder joint, at least for reliability purposes as well as typically for practical purposes as it is difficult to utilize a small amount of solder. The wire length needs to be long enough to allow soldering while the components are separated. This length of wire takes up space inside the package and can get in the way when closing the package. Accordingly, the packaging and, more precisely, the housing or body of the plug must accommodate such solder joints and hookup wire, resulting in a larger plug package size or dimension directly attributable to the solder joints and hookup wire.

One example of a plug having internal circuitry for AC conversion to DC is described in U.S. Pat. No. 6,644,984, to Vista, Jr., et al. Notably, the '984 patent is directed towards reducing the package size and the profile of the plug, as well as eliminating the need for flexible wires or direct soldering between the blades and the circuitry, which purported results in quicker assembly.

Nonetheless, the various forms of the '984 patent have an elongated plug length due to the manner of connecting the blades with the circuitry. Each of the forms described has a forward body portion in which the blades are mounted, the blades having a rearward extension that is connected, without solder, with contact terminals on a PCB. Each of the contact terminals requires an fore-to-aft extended structure for either forming a leaf spring biased against the blade or supporting a receptacle for receiving a portion of the blade therethrough. In each form, then, the configuration and construction of the blades and the contact terminals require additional length for the plug size and package. Furthermore, the structures for the contact terminals require a certain amount of material and are stamped into form.

The '984 patent also requires additional components and manufacturing steps. While the forms illustrate a manner of connecting the blades without the use of solder, the designs still require blades that are insert molded into the forward body portion. In the simplest form, the manufacturing steps include first securing the PCB in a rear housing/body portion in proper alignment, then advancing the rear body portion and PCB toward and into engagement with the forward body portion and blades molded therein, whereupon the body portions are secured. In more complicated designs, the forward body portion first receives the PCB, and the subassembly is then mounted into a clamshell-type rear body portion having top and bottom halves.

Accordingly, there has been a need for an improved plug package design with a reduced size and improved manufacturability.

SUMMARY

In accordance with an aspect, a charger plug is disclosed including internal circuitry for converting input electrical power to output electrical power, a housing comprising upper and lower halves defining an interior space for the internal circuitry, an input assembly including prong portions for connecting with a power outlet and at least one leg portion, wherein at least one of the upper and lower halves includes an opening for slidably receiving each leg portion, and a pair of electrically conducting spring contacts in biased engagement with respective portions of the input assembly for receiving input electrical power therefrom, the spring contacts in electrical connection with the internal circuitry.

In some forms, the input assembly includes a pair of electrically conducting blade members including respective prong portions, a portion of each blade member being received in respective openings in the upper and lower halves. The upper and lower halves may each include a pair of blind openings oriented generally vertically for receiving respective portions of the blade members therein for securing the blade members. The spring contacts may be mounted on the internal circuitry and be biased against a portion of the blade members.

In some forms, the input assembly includes first and second blade members including respective prong portions, each of the blade members having a portion rearwardly located from the prong portions and slidably received in openings in each of the upper and lower halves for slidably mounting therein. The openings and blade member rearward portions may be configured for a frictional and non-rotational fit therebetween. The spring contacts may be in biased engagement with the blade member rearward portions. The spring contacts may be formed of wire for low manufacturing cost. The spring contacts may include a flexing spring arm portion and a torsion spring portion for contacting the blade members and may include a portion designed to snap-fit within the internal circuitry for assembly ease. The spring arm portion may extend in a longitudinal direction and be resiliently flexible in a lateral direction thereto, and shifting of the spring arm portion from a natural position by the blade members may create a contacting force therebetween for providing and maintaining electrical connection between the spring contact and its respective blade member. The spring contacts may also include a portion secured with the internal circuitry to resist rotation of the snap-fit portion. The spring arm may include a forwardly extending portion for biased engagement with the blade members. The spring contacts may further include a torsionally flexing spring arm portion for providing an elastic contacting force with the blade members.

In some forms, the input assembly may include the prong portions being secured without molding such as insert molding.

In some forms, the electrical connection between the input assembly and the spring contacts is solder-less.

In another aspect, a charger plug providing power conversion for rechargeable electronic devices is disclosed, the charger plug including internal circuitry for converting input electrical power to output electrical power including a plurality of components for power conversion mounted on at least one board and including electrical connections for receiving power, an input assembly including first and second blades having prong portions for connecting with a power outlet and transmitting input electrical power to the internal circuitry via the electrical connections, and a housing defining an interior space for the internal circuitry and slidably mounting the input power assembly therewithin and in electrical communication with the electrical connections, the electrical connections being forwardly biased into engagement with the blade members.

In some forms, the blades are separate members having a rearward structure with a rearwardly oriented surface, the housing includes openings for slidably receiving portions of the blades, and the electrical connections are forwardly biased into engagement with the rearwardly oriented surface.

In some forms, the housing includes upper and lower halves, each of the halves includes openings for receiving generally vertically oriented leg portions of the blades, and each of the halves includes slots for forwardly extending prong portions.

In a further aspect, a charger plug for converting input alternating current power received from a power outlet to output direct current power, the charger plug being electrically connectable to a rechargeable electronic device for providing power thereto, is disclosed, the charger plug including a housing having a first end oriented towards a power outlet when connected thereto and a second end extending in a first direction away from the first end, and first and second separate blade members secured with the first end of the housing so as to have prong portions extending in the first direction from slots formed in the housing, the blade members having mounting portions extending in a second direction that is transverse to the first direction, wherein the housing includes openings for slidably receiving the mounting portions.

In some forms, each of the blade members is shaped with a prong portion extending in the first direction, with an elbow portion connected with the prong portion, and with the mounting portions connected to the elbow portion, wherein at least either the elbow portion or the prong portion extends through the slots. The housing may include upper and lower halves, the blade mounting portions may have generally rectangular cross-sections, each of the halves may include respective openings of generally rectangular cross-section for receiving the rectangular blade mounting portions, and the slots may be defined by slot portions of both of the halves.

In some forms, the charger plug includes internal circuitry for converting the power, the internal circuitry having a board for supporting components thereon, the board including an elongated slot and an opening, and spring contacts formed of wire and including a compressible elbow portion for snap-fit receipt in the elongated slot and including an extending portion received in the board opening for resisting forces on the spring contacts, wherein the spring contacts are biased into engagement with the blade members for electrical connection.

In some forms, the charger plug is sized so as not to impede access to or use of an adjacent outlet.

In some forms, the charger plug includes a power cord mounted at the second end of the housing for providing output power to the electronic device. The charger plug may include a connector for connecting with a power cord to provide output power to the electronic device. The connector may be mounted for connecting with the power cord proximate the second end of the housing. The blades may be connectable with the power outlet when advanced in said first direction and be removable from the power outlet when advanced in a direction opposite said first direction, and the power cord may be electrically connectable with the connector when advanced in said first direction and be removable from the connector when advanced in said direction opposite said first direction. The connector and blades may be generally aligned relative to each other.

In a still further form, a method of assembling a charger plug for converting input electrical power to output electrical power is disclosed, the method comprising the steps of providing a pair of blade members including a first portion in the form of a prong for each of negative and positive terminals of the charger plug and including a second portion for mounting, forming a housing having at least respective openings for receiving the second portion of each of the blade members in an interior of the housing and having at least a slot for permitting the prong of each blade to extend forwardly from the housing for connection to an electrical outlet, providing internal circuitry for power conversion, the internal circuitry including a board for supporting components thereon, for each of the positive and negative terminals, providing a spring contact member having a spring arm, mounting the spring contact members on the board in electrical connection with the internal circuitry, slidably inserting the second portion of each blade member in the interior openings of the housing for mounting the blade members therewith, after the slidably inserting step pressing the spring contacts against a rearward surface of the blade members to shift the spring arms towards the board, and after the pressing the spring contacts step closing the housing.

In some forms, the method further includes the step of, after the pressing the spring contacts step pivoting the board towards the housing to bring the board into registry with structure on the interior of the housing.

In an additional aspect, a charger plug is disclosed for connecting with a power outlet to converting input current power received from the power outlet to output current power, the charger plug being electrically connectable to a rechargeable electronic device for providing the output current power thereto, the charger plug including a housing having a first portion oriented towards a power outlet when connected thereto and a second portion, the charger plug including first and second separate blade members secured with the first portion of the housing so as to have prong portions of the blade members extending in the first direction from the housing, and the charger plug including a connector at the second portion of the housing, the connector adapted for removably receiving a corresponding apparatus for transmitting power to the electronic device, the improvement of the charger plug being the connector is aligned with the prong portions, and the connector receiving the corresponding apparatus in a direction substantially opposite the first direction.

In some forms, the improvement may also include the housing having a tapered portion at a rear end thereof, the tapered portion having an opening, and the connector being accessible through the tapered portion opening. In some forms, the charger may include a supporting substrate on which internal circuitry for converting power is mounted, and the improvement may also include the supporting substrate being a board extending in a lateral direction relative to the prong portions, the connector is mounted on the board, and the housing has a shape to provide a tactile indication of an orientation of the connector.

BRIEF DESCRIPTION OF THE DRAWINGS

In the Figures.

DETAILED DESCRIPTION

Figure 1:
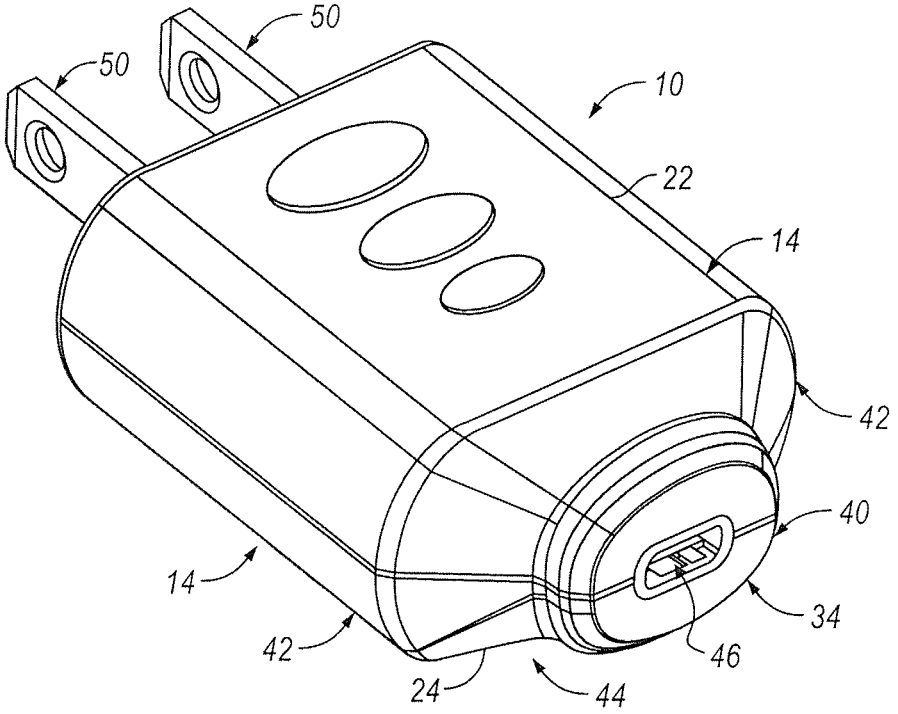
FIG. 1 is a rear perspective view of a plug of the present invention showing a connector opening at a rear end of the plug for receiving a connecting cord for electrically coupling the plug with an electronic device, prongs of blades extending from a forward end for receipt into an electrical outlet for receiving power therefrom.
Figure 2A:
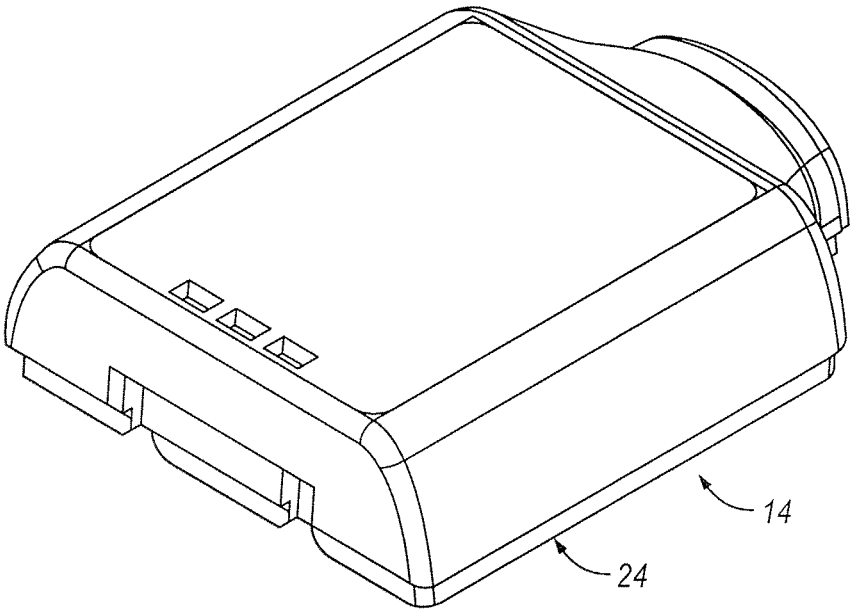
FIGS. 2A-2C are exploded perspectives of the plug of FIG. 1 showing a pair of blades including the prongs, an internal circuitry assembly for power conversion including a printed circuit board and the connector being mounted thereon, spring contacts mounted on the printed circuit board for electrically coupling the blades to the printed circuit board, and housing upper and lower halves for receiving the blades and internal circuitry.
Figure 2B:
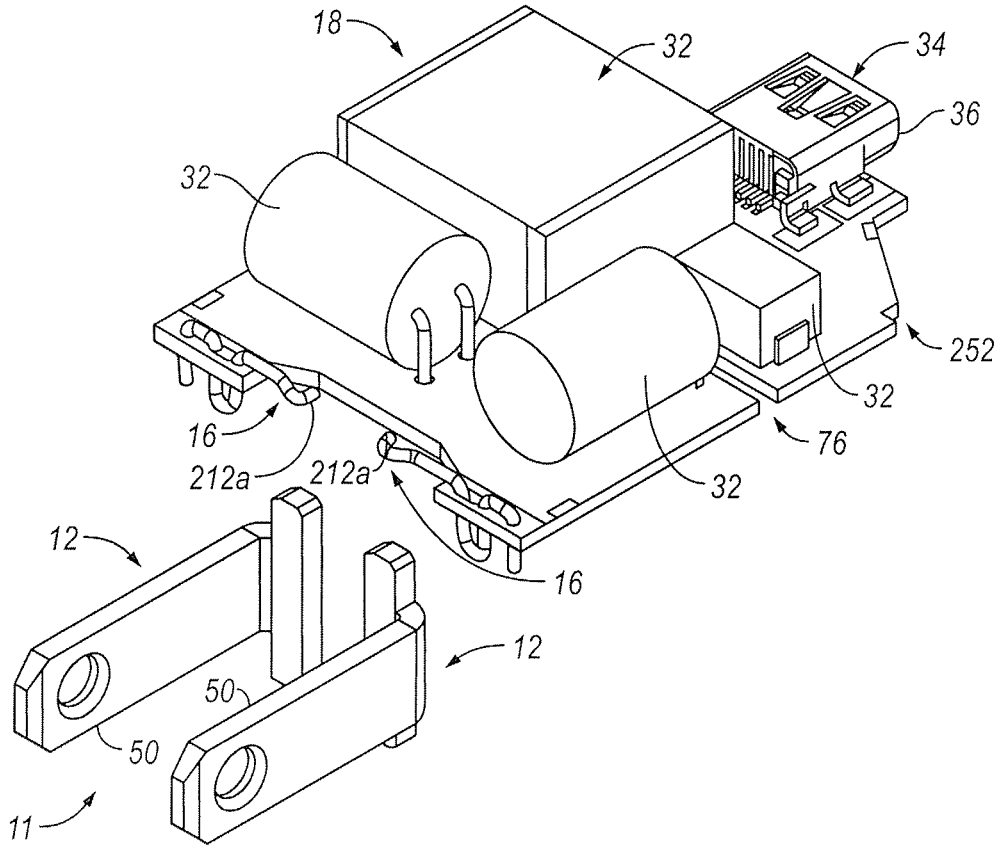
Figure 2C:
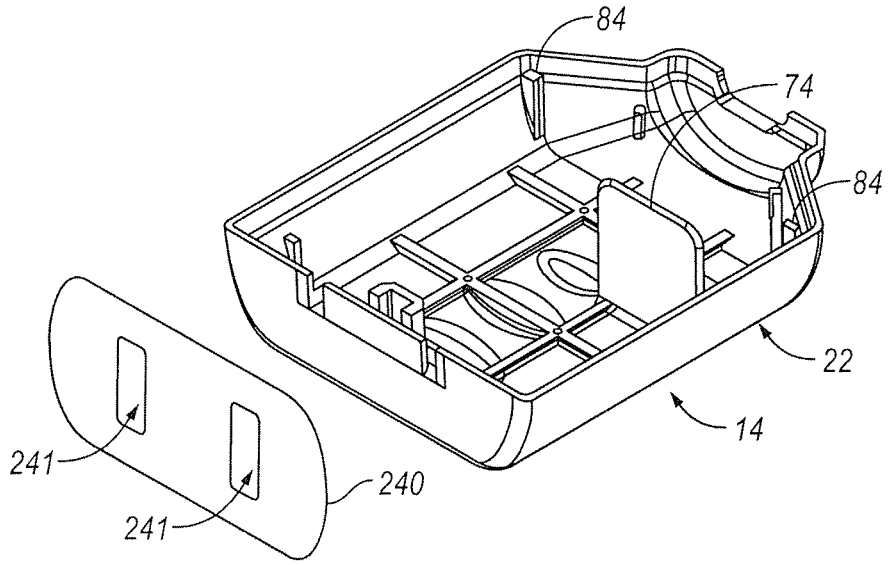

Referring initially to FIGS. 1-4, a plug 10 having a reduced package size and improved manufacturing is illustrated, the plug 10 preferably being a AC to DC charger plug for converting input electrical power to output electrical power, thereby providing charging power to rechargeable portable electronic devices or the like. As can be seen, the plug 10 benefits from a structure and method of assembly provided by an input assembly 11 which, in the present form, includes a pair of blades 12 having prong portions 50, discussed below. The blades 12 are received by a housing 14, and the plug 10 further includes spring contacts 16 for electrically connecting the blades 12 with internal circuitry 18 of the plug 10.

In the present form, the housing 14 is a clamshell-type housing having upper and lower halves 22 and 24. The internal circuitry 18 and blades 12 are assembled into one of the halves 22, 24, and the halves 22, 24, are then secured together such as by electronic welding or by a snap-fit, as are known in the art.

In the present form, the internal circuitry 18 includes a supporting substrate, such as a board 30 which is preferably a printed circuit board (PCB), onto which electronic components 32 are secured and assembled, the components 32 being supported thereon. The components 32 preferably include a power conversion circuit for receiving an input alternating current (AC) voltage, for reducing the voltage, for converting the AC to direct current (DC), and for transmitting the DC with the reduced voltage to an output 34. In the present form, the components 32 include a connector 36 for coupling with a removable power cord 37, the power cord 37 in turn able to be coupled to an electronic device (not shown) for providing the reduced voltage DC power to the electronic device. When assembled, the connector 36 is positioned at a rear end 40 of the housing 14, and the housing 14 is preferably tapered from lateral sides 42 and from upper and lower sides 44 towards a connector opening 46 configured in registry with the connector 36 to provide access to the connector 36. This tapering minimizes weight and materials cost, as well as provides a desirable aesthetic for the plug 10.

In greater detail, it can be seen that that the blades 12 and housing 14 provide a direction of insertion into a power source (outlet or power strip having one or more receptacles), the plug 10 being advanced towards the outlet in the insertion direction so that the blades 12 are received in the outlet and the plug 10 being withdrawn or advanced away from the outlet in an opposite, removal direction to remove the blades 12 from the outlet. The connector 36 allows for the power cord 37 to be received therein by advancing the power cord 37 in the same insertion direction, and the power cord 37 to be removed from the connector 36 in the same opposite, removal direction. The power cord 37 includes a plug end 37a that is receivable and removable from the connector 36 and, in a preferred form, the extent of advancement in the insertion or removal directions for the plug end 37a relative to the connector 36 is less than the extent of advancement of the blades 12 for insertion or removal from the power outlet. In this manner, once the plug 10 is received in the power outlet, it is easier (i.e., requires less space and movement) to disconnect the power cord 37 from the plug 10 than it is to remove the plug 10 from the power outlet. The configuration of the connector 36 relative to the blades 12 also allows the plug 10 to be secured with and/or removed from the power outlet by advancement through a relatively small space (e.g., minimal clearance in directions lateral to the directions of insertion/removal), and the power cord 37 can be connected/removed through the same relatively small space. In the most preferred form, the connector 36 is positioned in the plug 10 so that it is aligned with the blades 12.

Figure 5:
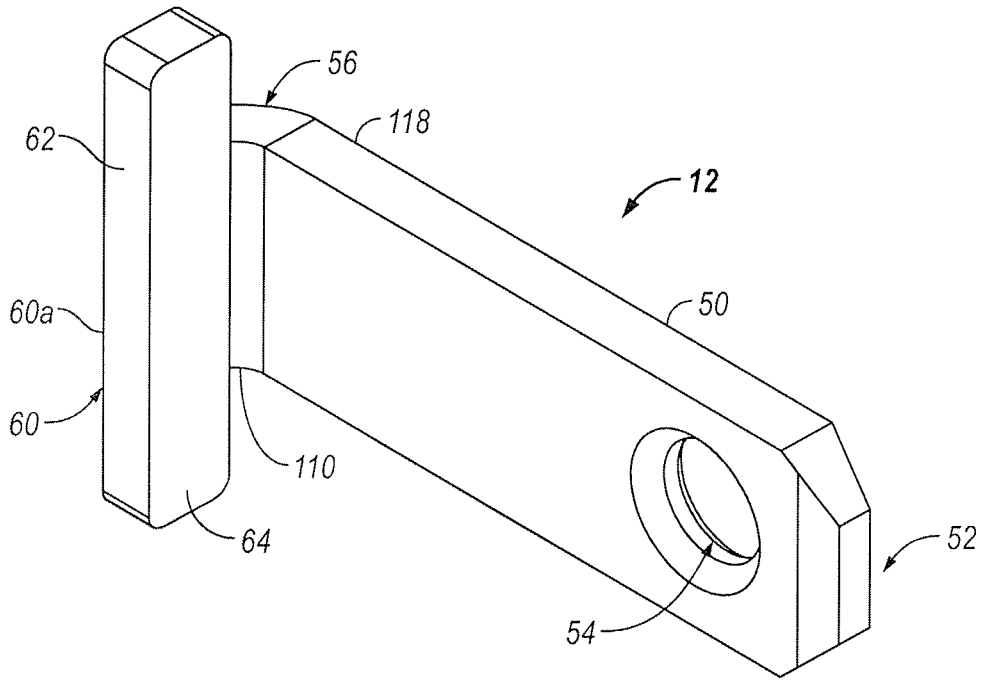
FIG. 5 is a perspective view of the blade of FIG. 1.
Figure 6:
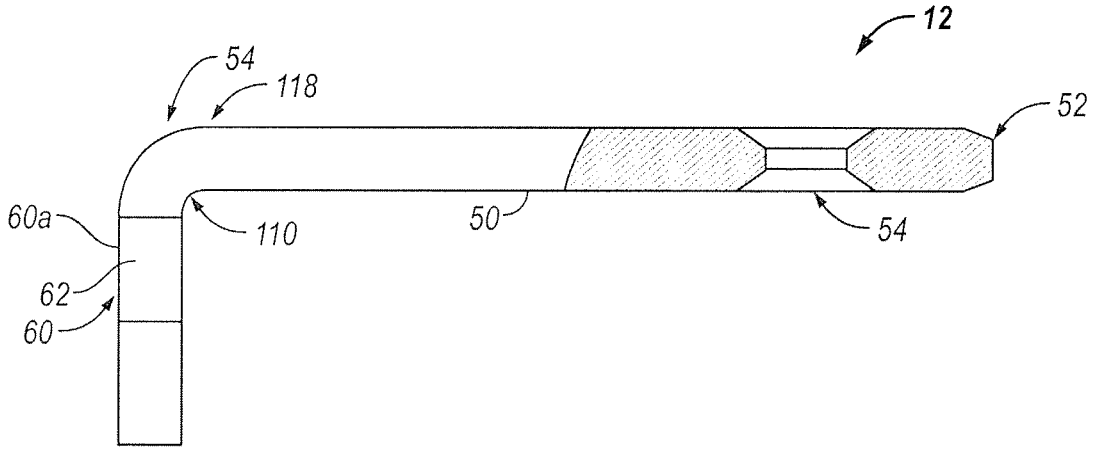
FIG. 6 is a top plan view of the blade of FIG. 1 with a partial cut-away to show a configuration of a bore therethrough.

Turning to FIGS. 5 and 6, one of the blades 12 is illustrated. The plug 10 is provided with a pair of blades 12 for connection with a standard power outlet, i.e., 120 VAC. In order to simplify parts and assembly, it is preferred that the each of pair of blades 12 is identical to the other, though reversed in orientation when secured in the plug 10. As can be seen the blade 12 includes a prong portion 50 with a size and shape known in the art to include a beveled terminus 52 and a bore 54.

The blade 12 is generally formed integral as a unitary item and, preferably, is a simple cut and stamped component. The cold-working of the stamped blade 12 provides rigidity and strength to the blade 12. The prong 50 extends from the terminus 52 rearwardly to an elbow portion 56 that forms an arc of 90 degrees. As can be seen, the blade 12 in the horizontal direction has uniform thickness throughout, other than the terminus 52 and bore 54, though such may be varied according to design criteria such as for reducing materials.

Figure 3:
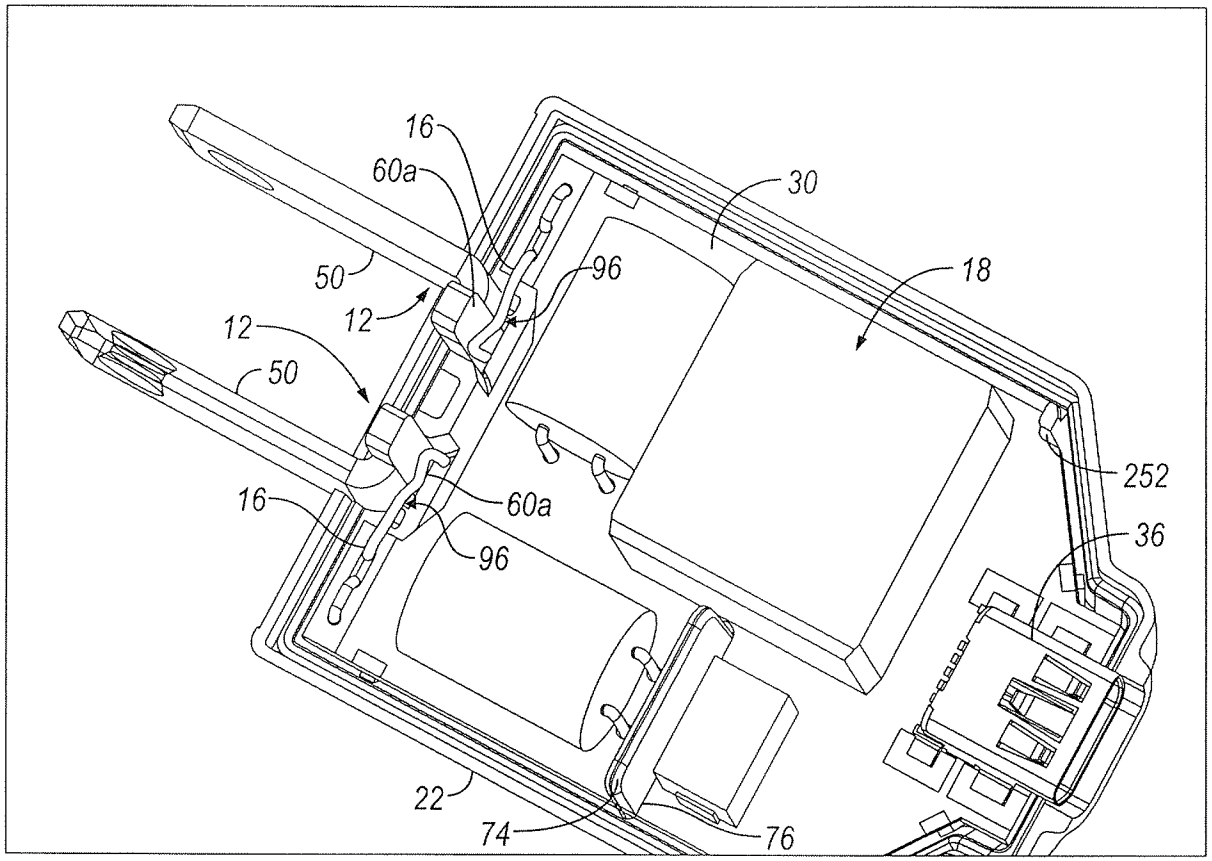
FIG. 3 is a perspective view of the plug of FIG. 1 with the lower housing half removed to show the spring contacts coupled with the blades mounted in the upper housing half.

The elbow 56 is joined to a vertical bar portion 60 having a greater vertical dimension than the elbow 56 and prong 50 so that the bar 60 forms first and second legs 62 and 64 which, depending on orientation when assembled, serve as either upper or lower legs. As will be discussed below, the legs 62, 64 are received in one of either the upper or lower housing halves 22, 24. Additionally, when assembled, the bar 60 is electrically connected with a spring contact 16, preferably by biased engagement between the spring contact 16 and a rearwardly oriented and vertical surface 60a of the bar 60, as can be seen in FIG. 3.

Turning to FIGS. 7-11, a form of the upper housing half 22 is illustrated. The upper housing half 22 partially defines an interior region 70 into which the internal circuitry 18 is positioned during assembly. Extending from an internal surface 72 of the half 22 is a plate 74 which assists in registry of the half 22 with the PCB 30 which has a slot 76 for receiving the plate 74. A rear end 78 of the half 22 includes a tapered region 80, as described above, that forms a portion of the connector opening 46. The half 22 includes generally radiused sides 82, which serve to reduce packaging size and materials as well as promotes removal from the mold assembly, and interior runners 84 that provide rigidity to the plug 10, and that provide registry for the PCB 30 (as can be seen in FIG. 3). Additionally, it should be noted that the half 22 has a peripheral wall 86 and an interior shoulder 87 formed therewith, the runners 84 extending downward beyond the shoulder 87 to define a recess 88 between the wall 86 and the runner 84 for receiving a tongue 89 formed on the lower housing half 24, as will be discussed below.

Figure 4:
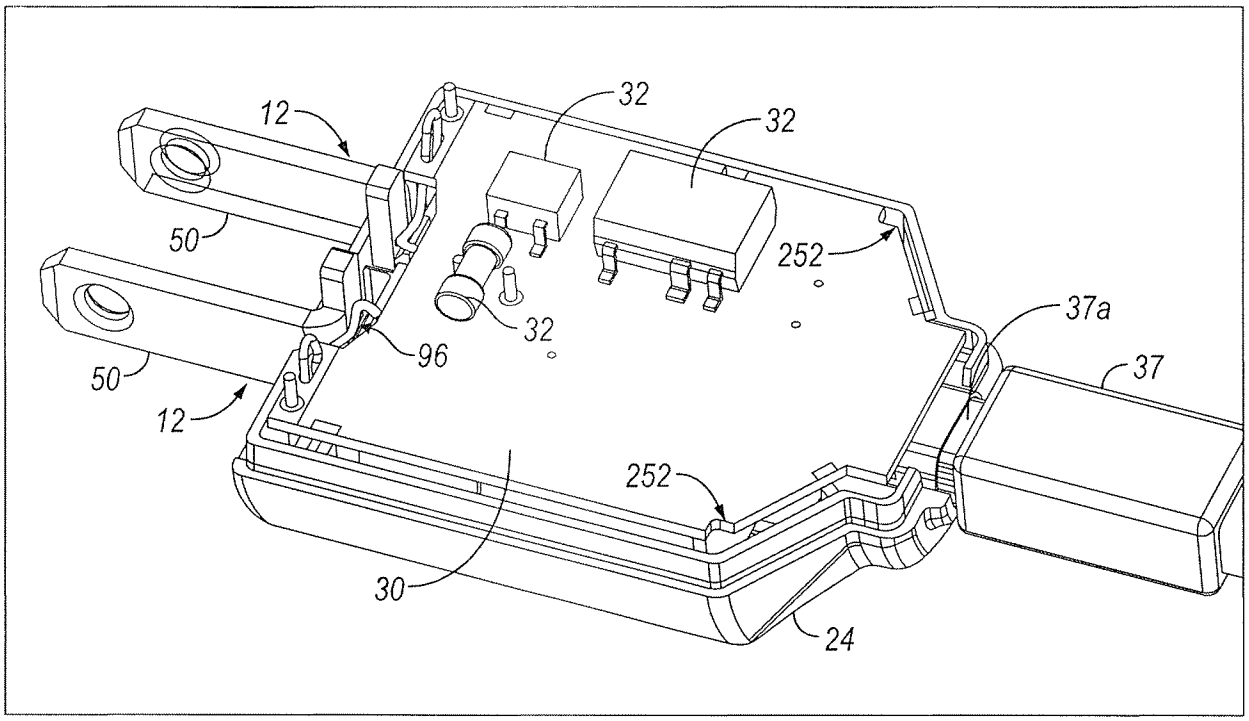
FIG. 4 is a perspective view of the plug of FIGS. 2A-2C with the upper housing half removed to show the spring contacts coupled with the blades mounted in the lower housing half, a power cord coupled with the connector for providing power to an electronic device.

A front end 90 of the upper housing half 22 includes structure 92 for receiving, positioning, and somewhat securing blades 12 therewith. In general, the structure 92 includes portions defining a slot 94 which receives and constrains the blade 12 at or about the elbow 56 and/or the prong 50, and the structure 92 includes portions defining a blind opening 96 for receiving one of the legs 62, 64, as can be seen in FIGS. 3 and 4.

Figure 8:
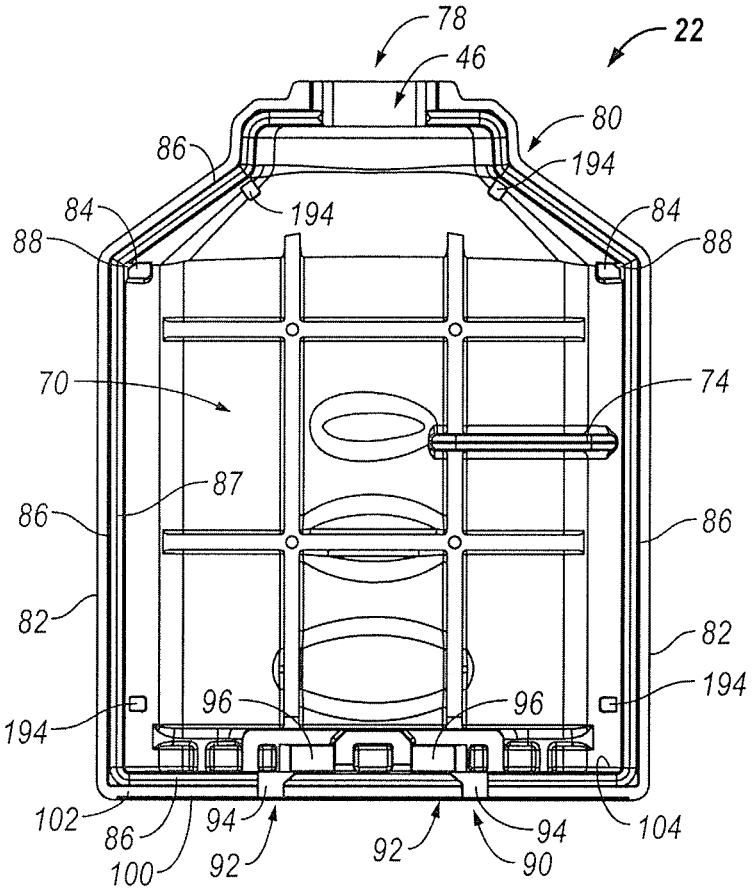
FIG. 8 is a bottom plan view of the upper housing half showing a configuration of the slots and showing blind openings for receiving and positioning the blades therewithin.
Figure 9:
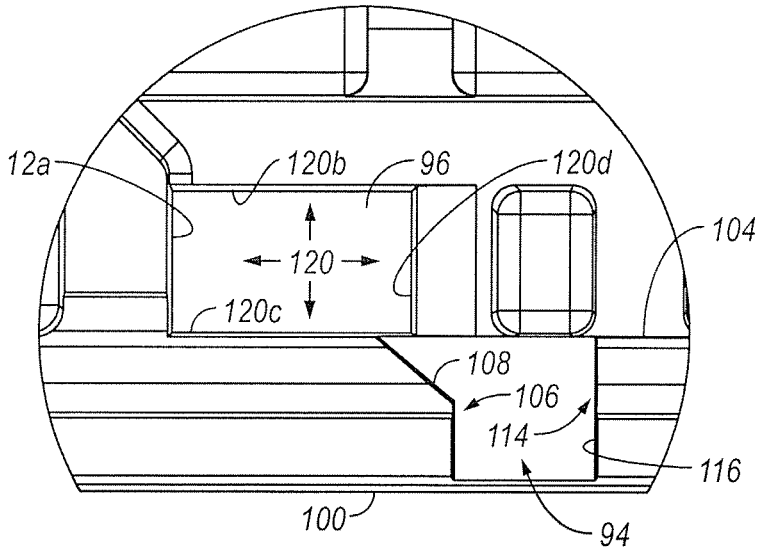
FIG. 9 is an enlarged view of detail 9 of FIG. 8 showing the configuration of one of the slots to accommodate the configuration of the blade received therein.

With particular emphasis on FIGS. 8 and 9, the slot 94 passes through from a front surface 100 of a front wall 102 to a rear surface 104 thereof. An inboard side 106 of the slot 94 includes a structure 108, shown as a bevel or chamfer, for accommodating and, preferably, abutting an inner curve side 110 of the elbow 56 to provide constraint thereagainst. While the structure 108 may be curved to match the elbow 56, such would require greater precision in tolerances without appreciable constraining benefit. An outboard side 114 of the slot 94 simply includes a generally flat surface 116 that merely need make contact with an outer surface 118 of the prong 50 and/or elbow 56.

The blind opening 96 preferably has a non-circular cross-sectional shape 120 and is preferably shaped to receive a blade leg 62, 64 in a relatively defined position. More preferably, the legs 62, 64 are rectangular in cross-sectional shape, the blind opening shape 120 is rectangular having walls 120a-12d, and the blind opening 96 is sized to receive a leg 62, 64, therein with a small amount of friction between at least two of the walls 120a-120d and the leg 62, 64 received therein, and the blade bar 60 is thus generally vertically aligned in a direction transverse to the direction that the plug 10 generally extends.

Referring now to FIGS. 12-15, a form of the lower housing half 24 is illustrated with similar structures as the upper housing half 22. Specifically, the lower housing half 24 partially defines the interior region 70 into which the internal circuitry 18 is positioned during assembly, includes a rear end 130 having a tapered region 132 forming a portion of the connector opening 46, includes generally radiused sides 134, and interior runners 136. In contrast to the upper housing half 22, the lower housing half 24 includes an exterior shoulder 137 positioned outside of the aforementioned tongue 89, the interior runners 136 joined with the tongue 89 to provide rigidity thereto. When assembled, the tongue 89 and runners 136 are received within the peripheral wall 86 of the upper housing half 22, the tongue 89 being received between the peripheral wall 86 and the upper runners 84. Depending on design criteria, the tongue 89 may be advanced within the peripheral wall 86 to an extent that a tongue top surface 89a contacts the shoulder 87, though this is not necessary. In alternative forms, the tongue 89 and peripheral wall 86 may be provide with snap fit structure, though in the present form the upper and lower housing halves 22, 24 are electronically welded or glued.

Figure 10:
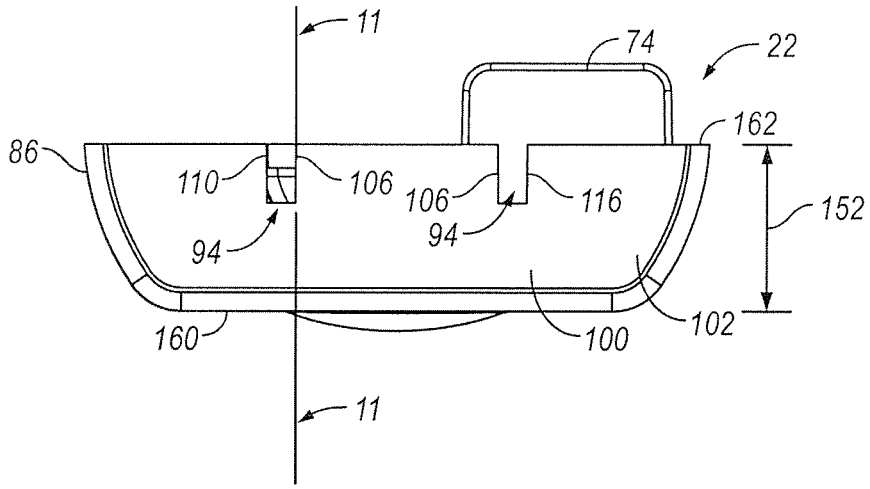
FIG. 10 is a front elevation view of the upper housing half.
Figure 11:
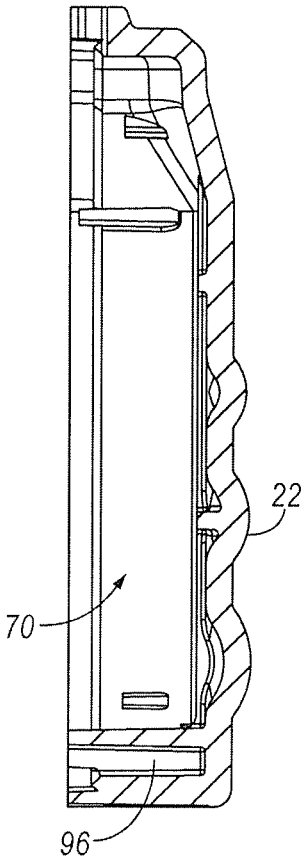
FIG. 11 is a cross-sectional view taken through the line 11-11 of FIG. 10 showing the configuration of one of the slots thereof.
Figure 12:
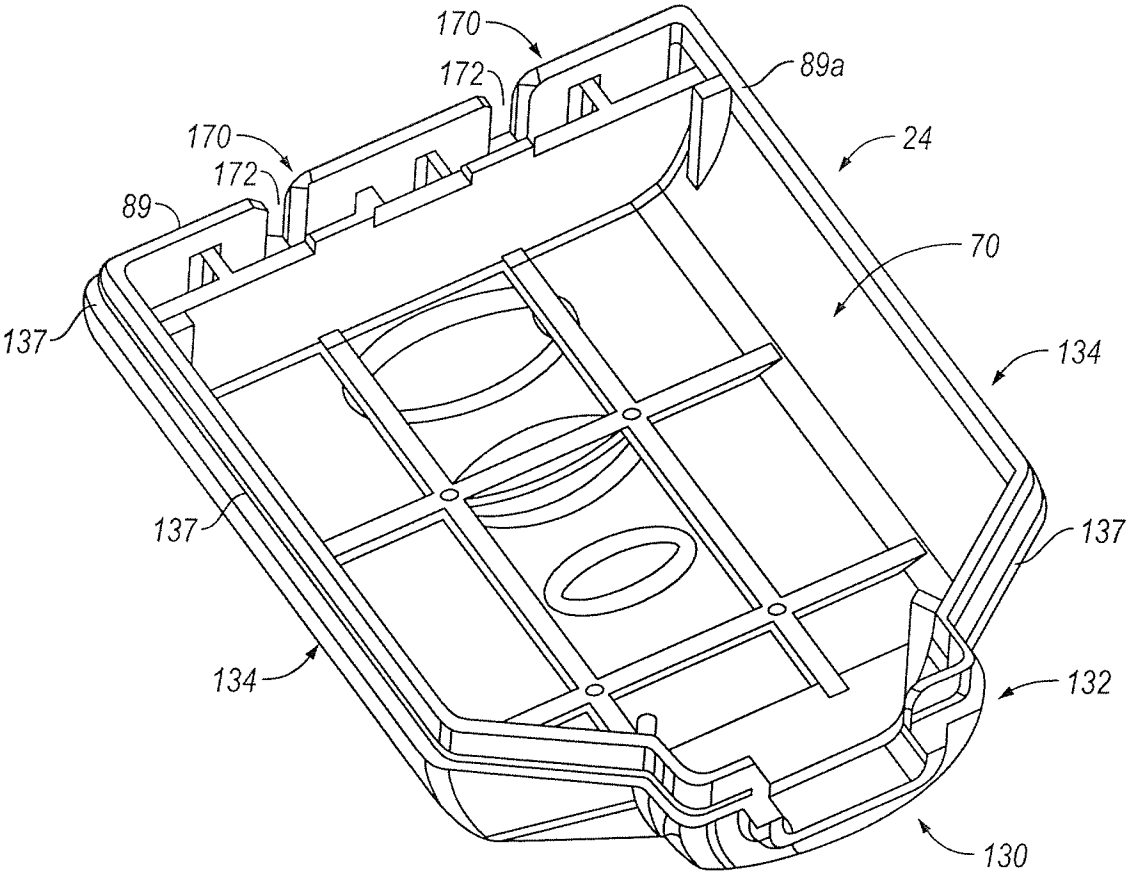
FIG. 12 is a perspective view of the lower housing half showing structure for receiving the printed circuit board therewithin, showing slots for receiving the blades to secure the blades and permit a prong portion thereof to extend from the upper housing half, and showing a peripheral tongue for receipt into the upper housing half.
Figure 15:
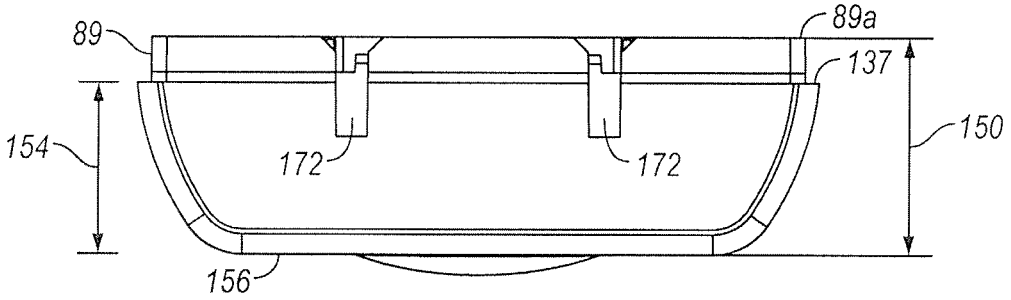
FIG. 15 is a front elevation view of the lower housing half.

Comparing FIG. 10 showing the upper housing half 22 and FIG. 15 showing the lower housing half 24, it can be seen that the lower housing half 24 has a vertical dimension 150 that is greater than a vertical dimension 152 of the upper housing half 22, except for the plate 74. The greater dimension 150 is a result of the protruding tongue 89. However, a vertical dimension 154 of the lower housing half 24 from a bottom side 156 to the shoulder 137 is roughly approximate the vertical dimension 152 of the upper housing half 22 from a top side 160 to a top surface 162 of the peripheral wall 86.

Like the upper housing half 22, the lower housing half 24 includes structure 170 for receiving, positioning, and somewhat securing blades 12 therewith. The structure 170 generally includes portions defining a slot 172 (the slot 172 being greater in vertical dimension that slot 94 of the upper housing half 22 due to the need for the slot 172 to pass through the tongue 89) which receives and constrains the blade 12 at or about the elbow 56 and/or the prong 50, and the structure 170 including portions defining blind openings 96 for receiving one of the legs 62, 64 in a manner substantially identical to that of the upper housing half 22.

Figure 13:
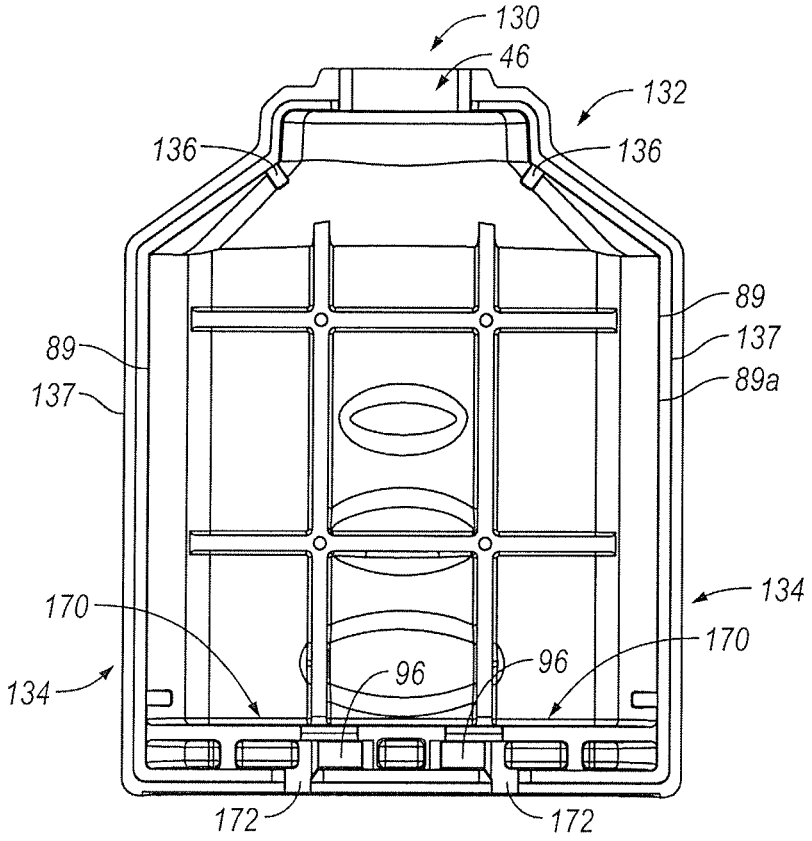
FIG. 13 is a top plan view of the lower housing half showing a configuration of the slots for the prong portions and showing blind openings for receiving and positioning the blades therewithin.
Figure 14:
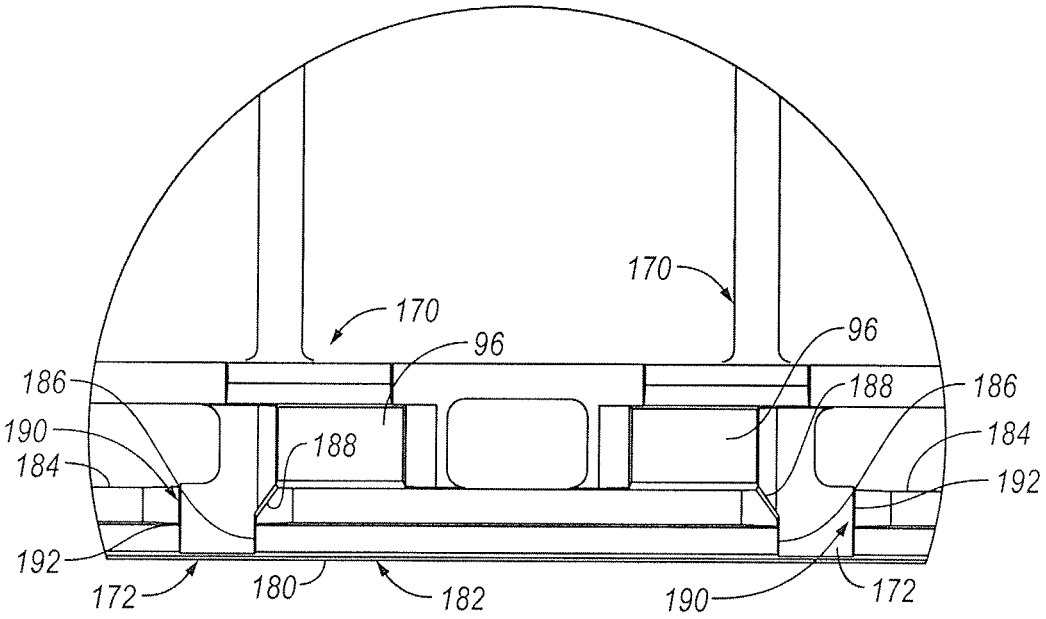
FIG. 14 is an enlarged view of detail 14 of FIG. 13 showing the configuration of the slots to accommodate the configuration of the blade received therein.

With particular emphasis on FIGS. 13 and 14, the slot 172 passes through from a front surface 180 of a front wall 182 to a rear surface 184 thereof. An inboard side 186 of the slot 172 includes a structure 188, shown as a bevel or chamfer, for accommodating and, preferably, abutting an inner curve side 110 of the elbow 56 to provide constraint thereagainst, while an outboard side 190 may have a flat surface 192, each feature of which being similar to that described for slot 94 of the upper housing half 22.

Figure 7:
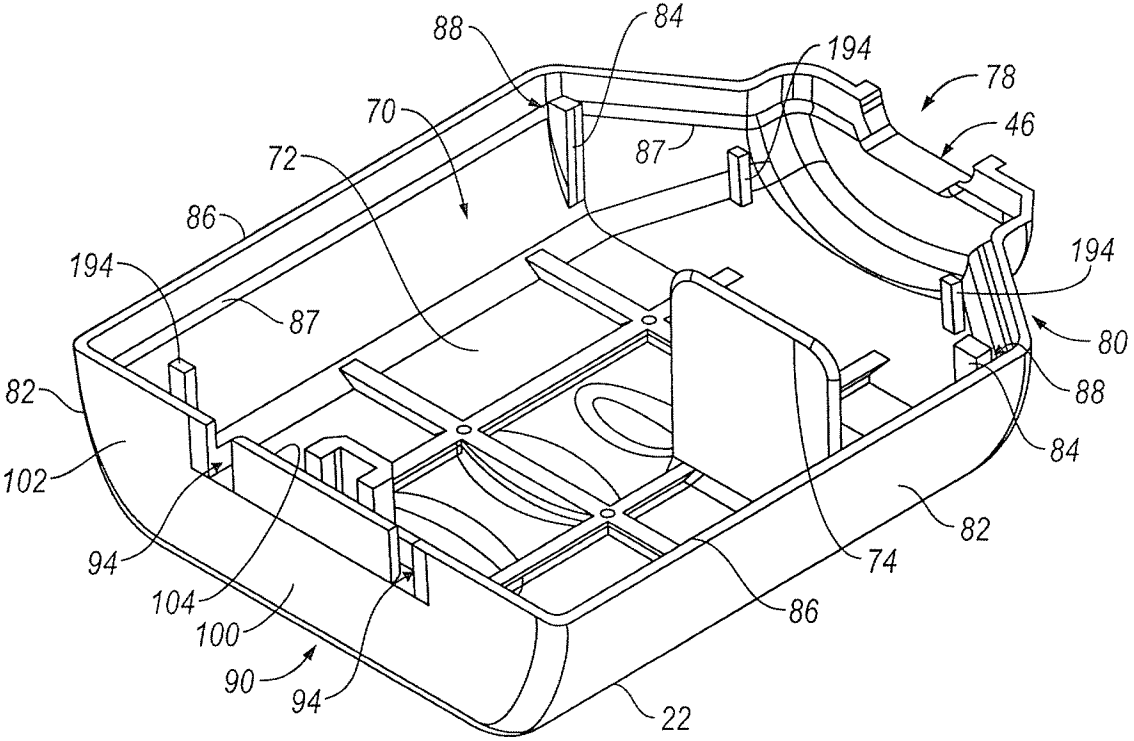
FIG. 7 is a perspective view of the upper housing half showing structure for positioning the printed circuit board therewithin, showing slots for receiving the blades to secure the blades and permit a prong portion thereof to extend from the upper housing half, and showing a peripheral shoulder formed for receiving the lower housing half.

The upper and lower housing halves 22 and 24 cooperate to constrain the vertical position of the PCB 30. As can be seen in FIGS. 7 and 8, the upper housing half 22 includes supports 194 against which the PCB 30 rests when the plug 10 is assembled. The runners [137] *136* of the lower housing half 24 contact the PCB 30 from an opposite side as the supports 194 so that the PCB 30 is somewhat constrained or lightly sandwiched between the runners [137] *136* and supports 194.

Figure 16:
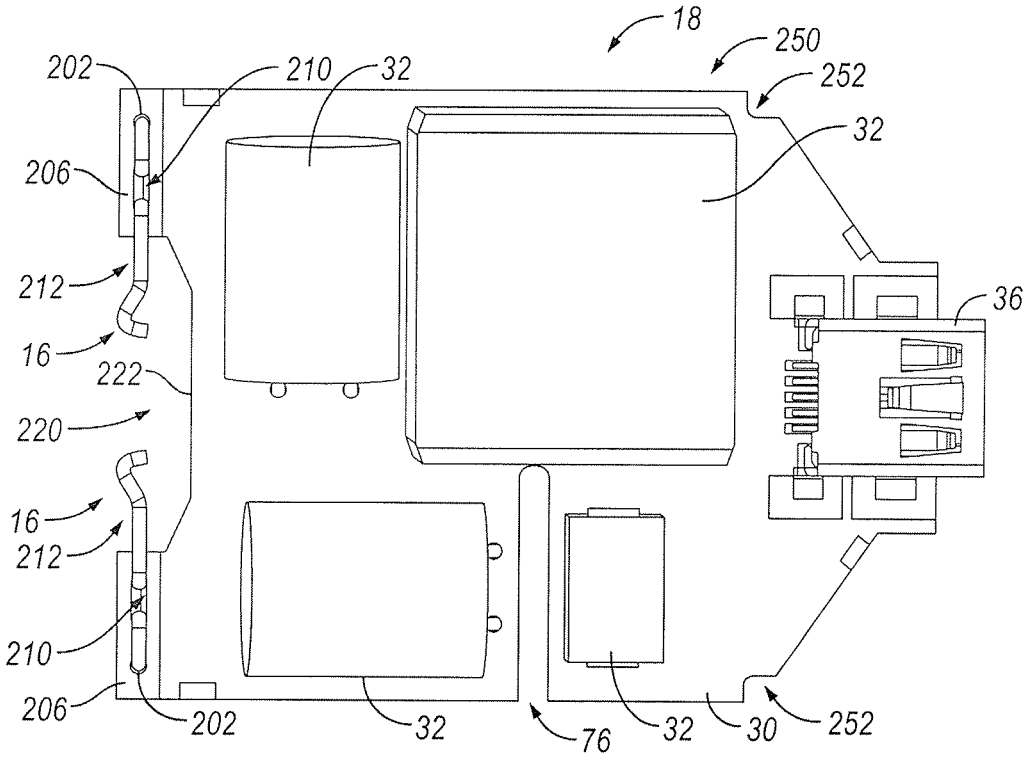
FIG. 16 is a bottom plan view of the internal circuitry showing the shape of spring arms of the spring contacts, showing a recess permitting the spring arms to shift rearwardly when pressed into the blades whereby bias of the spring contacts maintains the spring contacts in electrically communication and coupling with the blades.
Figure 17:
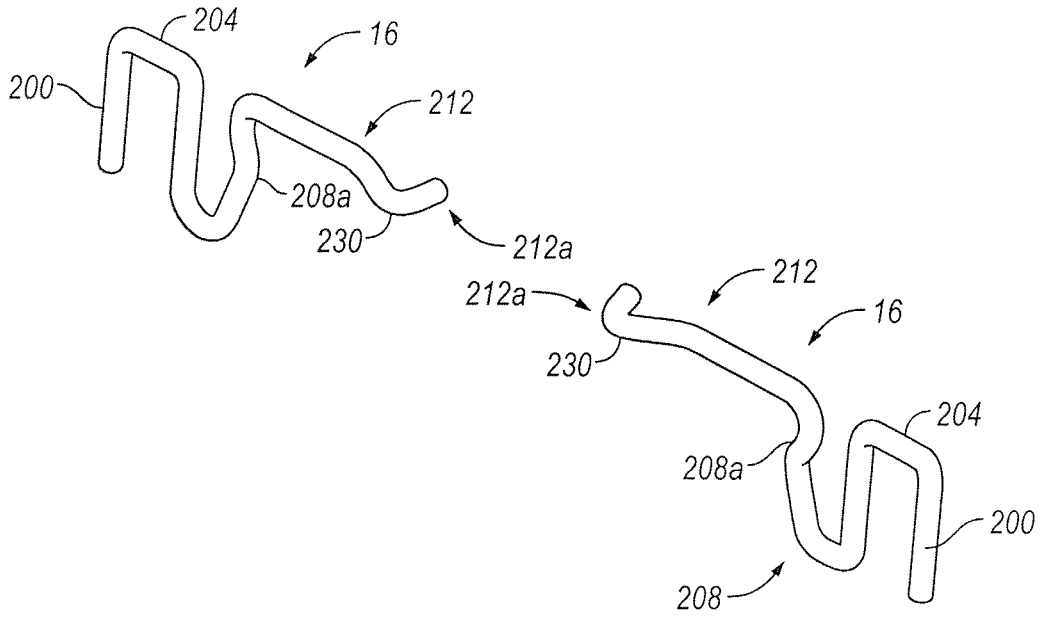
FIG. 17 is a perspective view of the relative positioning and the configuration of the spring contacts in a natural state, the spring contacts having an elbow portion for snap-fitting into the printed circuit board.
Figure 18:
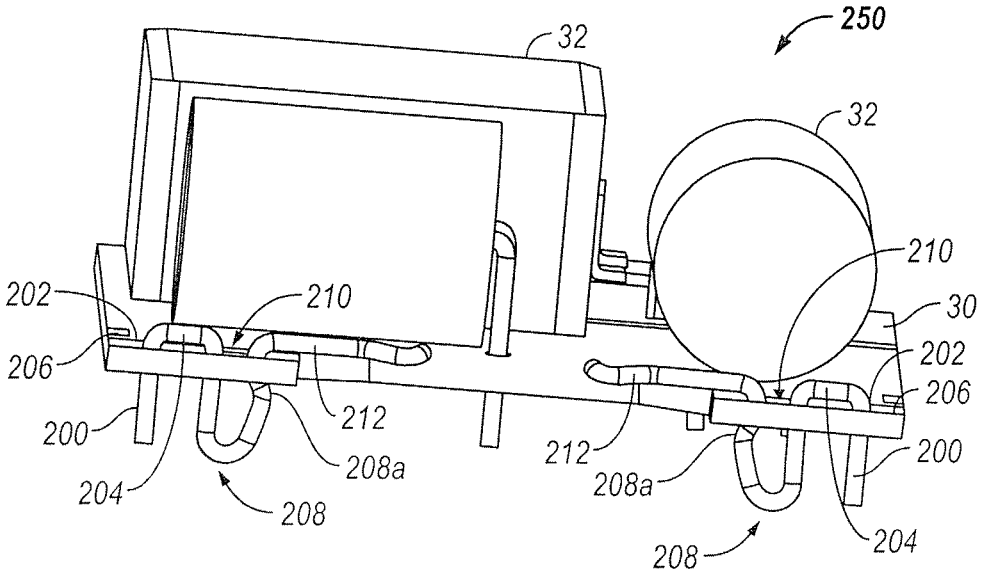
FIG. 18 is a front perspective of the printed circuit board with the spring contacts secured therewith.
Figure 19:
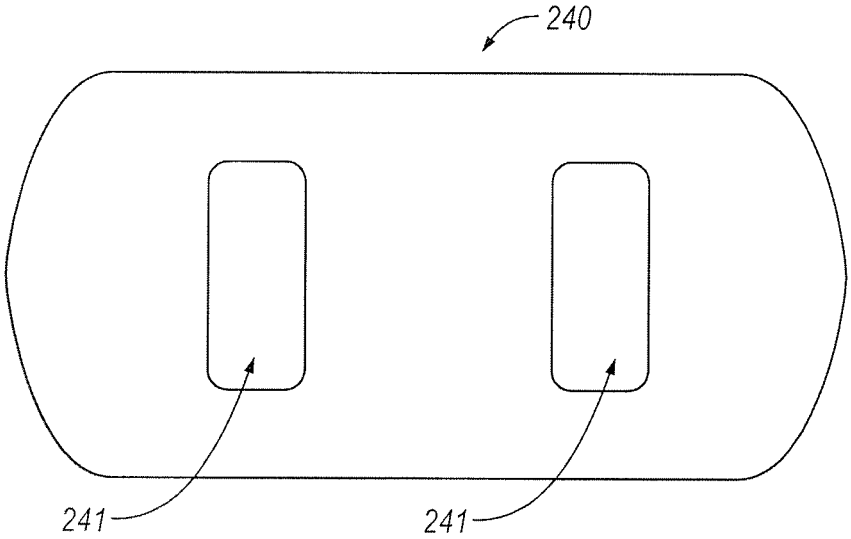
FIG. 19 is a front elevation view of a label positionable against a front surface of the assembled plug.
Figure 20:
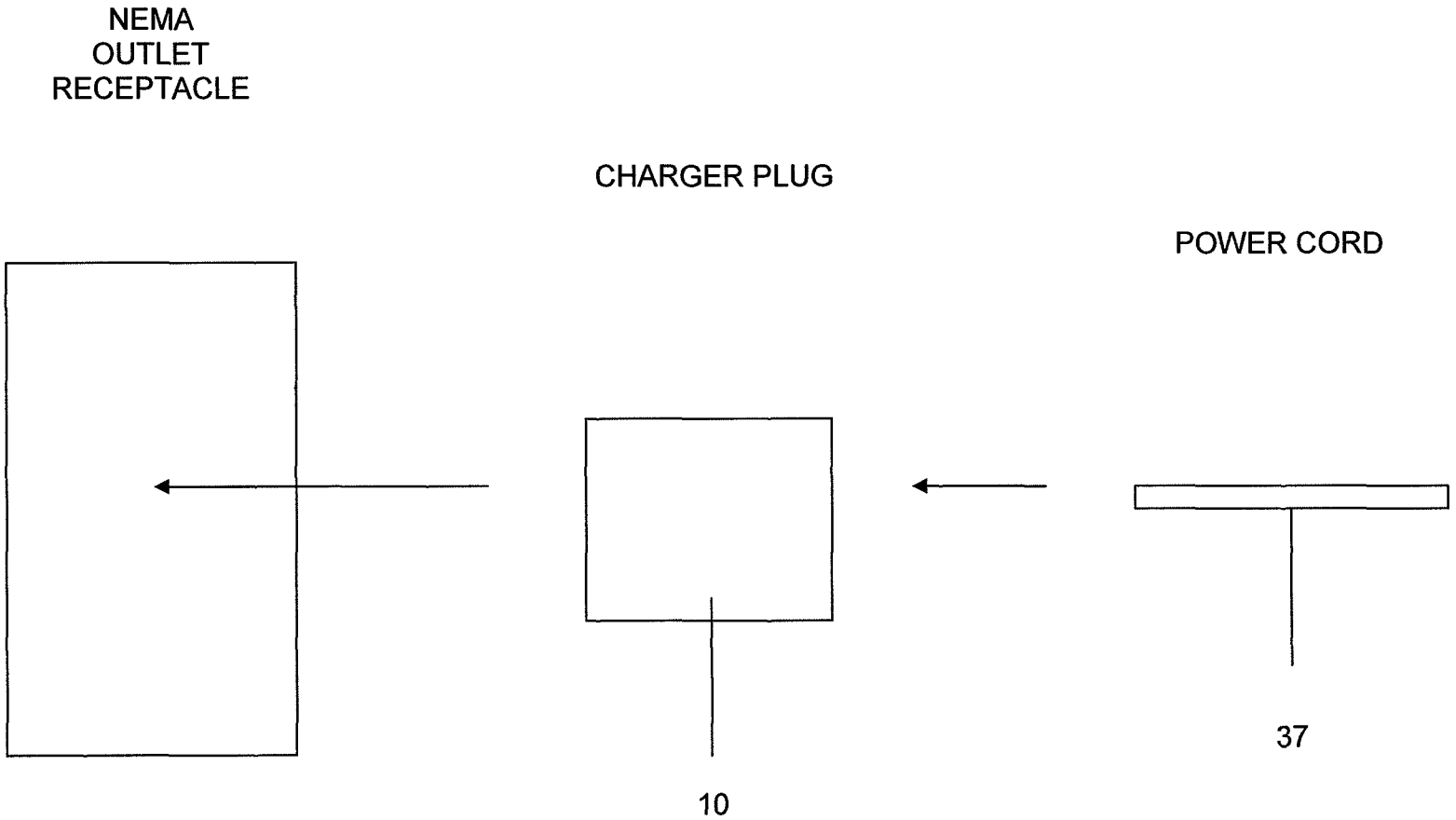
FIG. 20 is a schematic representation of a power cord mateable to a charger plug of the present invention mateable to a standard NEMA outlet.

Turning now to FIGS. 16-18, the internal circuitry 18 and spring contacts 16 are illustrated. As discussed above, the internal circuitry 18 preferably includes a PCB 30 and a pair of spring contacts 16. The spring contacts 16 are simply formed of wire and, thus, are much less expensive than contacts made by other means, such as stamped components. As the spring contacts 16 are used with respective blades 12, the spring contacts 16 are electrically isolated from one another. Each spring contact 16 includes a first extent 200 received in an opening 202 of the PCB 30, a second extent 204 running along a surface 206 of the PCB 30 when secured therewith, an elbow barb 208 received in an elongated opening 210 of the PCB 30, and a spring arm 212 extending from the barb 208. The spring arm 212 extends in a generally longitudinal manner, and extends generally parallel to the PCB 30, with the arm end 212a free so that the spring arm 212 is resiliently deflectable and/or flexible. This flexibility allows the spring arm 212 to provide a resilient bias force when deflected laterally from its natural position. The barb 208 is snap-fit into the elongated opening 210 such that the barb 208 is compressed inwardly and ramps over a barb point 208a as the barb 208 passes into the elongated opening 210. Thus, compression is required to remove the barb 208 and spring contact 16 from the PCB 30. Preferably, the barb 208 received in the PCB 30 is under compression so that friction between the barb 208 and PCB 30 reduces likelihood of shifting of the spring contact 16.

When the spring contact 16 is secured with the PCB 30, the blade bar 60 is received forward of the spring arm 212 and, to an extent, in a recess 220 formed at a forward edge 222 of the PCB 30, though other constructions could be utilized. When assembled as such, the spring arm 212 is shifted from its natural position and rearwardly into the recess 220 so that the forward bias of the shifted spring arm 212 serves to maintain the spring arm 212 and blade bar 60 in electrical connection. As can be seen, the spring arm 212 further includes a forwardly extending elbow 230 to provide additional bias force when the blade bar 60 contacts and forces the elbow 230 rearwardly. The bias force between the spring arm 212 and the blade bar 60 tends to cause a torque or rotation around a vertical axis. Accordingly, the first extent 200 serves to minimize the ability of the spring contact 16 to rotate when the plug 10 is assembled.

The shifting or deflection of the spring arm 212 is properly understood as a leaf spring, as a torsion spring, or as a combination of both, the spring contact 16 providing elastic contact force as described herein. That is, the spring arm 212 is resiliently deflectable in the manner of a leaf spring. The spring arm 212 is also secured or integral with the balance of the spring contact 16 that is secured with the PCB 30, which is secured in an offset manner relative to the direction of longitudinal extent of the spring arm 212. Therefore, when the spring arm 212 is shifted from its natural position, a torque is experienced between the spring arm 212 and, in the present form, the barb 208 secured in the elongated opening 210. Due to this torque, the operation of spring contact 16 (or, the cooperation between the spring arm 212 and the barb 208) can be viewed as a torsion spring for contacting the blade members.

Turning to FIGS. 2A-2C and 19, a label 240 having openings 241 for the prongs 50 is illustrated. Generally, regulatory bodies require an indication of certain information regarding electrical devices. The label 240 provides an easy and simple manner in which to provide this information, yet has additional benefits. For instance, by placing the label 240 on the front end of the plug 10, on front surfaces 100 and 180, the plug 10 has an improved aesthetic as such information is not visible by a user when the prongs 50 are received in a power outlet. The use of the label 240 allows the housing 14 to be used with charger plugs having a variety of ratings (i.e., output voltages) without separate housings 14 to be molded for each. Additionally, as the label 240 is provided with glue or pressure-sensitive adhesive, for instance, the label 240 may be used for assembly purposes by spanning the seam between the upper and lower halves 22, 24 at their front surfaces 100, 180.

An improved method of assembly is provided by the plug 10. The PCB 30 and the components 32 located thereon are provided as an assembly 250, and a pair of spring contacts 16 are mounted therewith so that the barb 208 is received in the elongated opening 210 and the first extent 200 is received in the opening 202. Separately, the upper housing half 22 is provided and, a pair of blades 12 are mounted therewith by advancing one leg 62, 64 of each blade 12 into the blind openings 96 with a frictional fit. Continued advancement of the blades 12 brings the elbow 56 and prong 50 into the slot 94. The PCB assembly 250 is then positioned with the spring contact spring arms 212 against a backside of the blade bars 60, the PCB assembly 250 being inclined with respect to the upper housing half 22 so the connector 36 is positioned above and out of the connector opening 46 portion of the rear end 78. Pressure is applied to the PCB assembly 250 towards the blades 12 so that the spring arms 212 are shifted rearwardly toward the PCB 30, creating a bias force therebetween. Subsequent or simultaneous with applying the pressure, the PCB assembly 250 is rotated or pivoted (the spring arms 212 generally providing the pivot or center of rotation) into the half 22 until the runners 84 are received within notches 252 formed in the PCB 30. The PCB assembly 250 is thus compressed somewhat between the runners 84 and the blade bars 60. The lower housing half 24 is then positioned with its interior open to the internal circuitry 18, and the blind openings 96 of the lower housing half 24 are aligned with the other legs 62, 64 of the blades 12. The lower housing half 24 is then advanced towards the upper housing half 22 so that the legs 62, 64 are received within the blind openings 96 thereof, and the elbow 56 and/or prong 50 is received within the slots 172. With continued advancement, the tongue 89 and peripheral wall 87 and related structures are brought together in the manners described above. The halves 22 and 24 are then joined such as by electronic welding, glue, use of the label 240, other known manners, or a combination thereof.

It should be noted that, as described, the dimensional size of the plug 10 at the front surfaces 100, 180 is small enough that the plug 10 does not interfere with use of an adjacent plug, such as is known for two- or three-outlet receptacles as defined by NEMA standards.

It should also be noted that the plug 10 locates the connector 36 and the opening 34 thereof in line with the prongs 50. To be specific, it is known that a typical device connected to a power outlet, such as a lamp or television, includes a plug, blades extending from the plug, and a cord extending from the plug in a direction opposite the blades. An example of a prior art charger having a receptacle, similar to the described connector 36 and connector opening 34, is that which is provided by Apple, Inc., for some of its popular IPod music player devices. When looked at from a side of the prongs, the Apple charger includes a relatively large housing with a somewhat square profile. The housing sufficient extends, relative to the prongs, so that the charger received in a power outlet could interfere with an adjacent receptacle, and would likely interfere with an adjacent receptacle on a power strip. Viewed in another direction, the charger housing is generally an elongated rectangle, a shape that conforms to the orientation of a motherboard or PCB therein for mounting of the charger components. The prongs of the Apple charger are pivotable, a feature designed to promote the portability of the charger, such as in a backpack.

As stated above, the Apple charger has a receptacle for connectably receiving a cord. However, the purpose of this is somewhat different than that suggested herein: the IPod device originally provided a single port for communication with a computer and for communication with a power source. That is, a IEEE 1344 or FireWire cord could be connected to the single port and, then, either connected to the charger or to a computer. Accordingly, the Apple charger was simply concerned with being able to remove the cord from the charger so that the same cord could then be connected to the computer. In other words, little attention was paid to the charger itself, aside from the pivotable prongs and the connectability feature. Additionally, the size and shape of the Apple charger are generally dictated by the internal components thereof, including the PCB.

The present plug 10 overcomes a number of deficiencies of the Apple charger and other prior art. For example, the plug 10 allows the plug 10 itself to avoid interfering with an adjacent receptacle of a wall outlet or of a power strip. This is achieved in a number of manners, including the configuration of the internal circuitry 18 and the size and shape of the plug housing 14. The present plug 10 has the blades 50 aligned with the opening 34, thereby presenting greater stability, also due to the configuration of the internal circuitry 18 and the PCB 30 and the housing 14, so that the connector 36 is mounted in centered alignment with the blades 50, both in vertical and horizontal directions. As discussed herein, the alignment of the connector 36 and opening 34 with the blades 50 allow the cord 37 to be easily connected with and removed from the plug 10 through relatively small spaces and without interfering with the use of adjacent outlets. While the surface of the Apple charger receiving the cord is flat, in the present plug 10 includes the tapered rear end 40 to assist a user with manually and tactiley locating, identifying, and connecting the connector 36 with the cord 37, as well as relative orientations of each, as may be necessary when reaching into a small space or when visual identification is difficult or impossible.

In a preferred form, the connector 36 is a mini-USB connector, though any type of connector may be used. As such, the plug 10 may be usable with a variety of cords 37, each having a standard plug end 37a, so that each of the cords 37 may connect the plug 10 with a particular device. In other words, a single plug 10 may be provided with a plurality of cords 37, and each of the cords 37 can be provided with a first end 37a for receipt into the connector 36, and with a second end (not shown) for connecting with a particular device, such as a particular make and model of cell-phone. Therefore, a person having multiple devices that may be used with plug 10 may each be connected with the connector 36 via the different cords 37. As examples of the utility of this, a traveler may reduce the chargers he or she must bring to a single charger, a person purchasing a new rechargeable device can simply buy an inexpensive cord 37 for connecting to the charger plug 10 for use with the device, and a person replacing a device need not also replace the charger.

While it is known in the art to provide one or more connectable cords for a single charger, it is not believed that any prior art charger having such feature is able to provide the stability and ease of use provided by having the connector opening 34 for accessing the connector 36 aligned with the blades 50, is able to provide a plug that permits use of the adjacent power outlets when connected, and provides a shape for the housing 14 and orientation of the opening 34 such that a user easily recognizes, such as without being able to visually inspect the plug 10, the proper orientation of the plug 37 when attempting to connect with the plug 10. To promote this, the PCB 30 is mounted in a lateral direction relative to the direction of the prongs 50 and the connector 36; in other words, while the prongs 50 and connector 36 extending in opposite directions and are respectively coupled with the outlet and cord 37 by movement along a general line, albeit in opposite directions, the generally planar PCB 30 is mounted in the housing 14 so that its plane extends between the prongs 50 and connector 36, as well as so that, were the plug 10 oriented so the upper housing half 22 is vertically oriented relative to, and directly above, the lower housing half 24, the PCB 30 is oriented in a horizontal manner.

As described, the plug 10 provides a number of benefits. The plug 10 size is reduced as the extent of the blades 12 beyond what is necessary for the prongs 50 is merely the size of the blade bar 60 and the thickness of the front walls 102, 182. The spring contacts 16 have little forward-to-rear directional dimension. The dimensional reduction over the aforementioned '984 patent is approximately 2-4 mm. Additionally, by not soldering the blades 12 to the spring contacts 16, package space required for soldering is eliminated, as are the labor costs and the risks of damage due to solder, the plug 10 can easily be disassembled if it is determined that one of the internal circuitry components 32 is defective, and the space on the PCB 30 required for electrical connection to the blades 12 is minimized. By securing the blades 12 in the manner described, the problems of insert molding or the like are eliminated. The reduced package size and steps of assembly reduce materials and labor required to manufacture and assemble the components and the plug 10 as a whole. The use of wire for the spring contacts 16 is a significant cost and materials savings over the complicated stamped components of the prior art. By way of example, the lateral width of the plug housing 14 is less than 1.75 inches, and preferably approximately 1.35 inches; the overall longitudinal length of the housing 14 is less than 2.0 inches, and preferably approximately 1.75 inches; and the height of the housing 14 is less than 1.0 inches, and preferably approximately 0.7 inches.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

[1. A charger plug capable of connecting with a two or three receptacle power source to convert 120V input power received from the power source to DC output power, the charger plug being electrically connectable to a rechargeable electronic device via a power cord for providing the DC output power thereto, the charger plug including a housing, the charger plug comprising:

first and second separate blade members secured within the housing so as to have prong portions of the blade members positioned in order to extend in a first direction from a front wall of the housing, the prong portions adapted to be received in the receptacle openings of the power source;

the charger plug including a DC connector having an aperture adapted to removably receive a corresponding power cord plug end for transmitting DC power to the rechargeable electronic device;

the charger plug housing forming a) a charger plug face area defined by the front wall b) an outer profile defined by a perimeter of the front wall and defined by a plug body extending rearward from the front wall and c) a rear end opposite the front wall;

the charger plug configured to be capable of plugging into a standard wall outlet and further:

i) being sized so that the charger plug housing comprises a longitudinal length extending between the front wall and the rear end and the longitudinal length is equal to or less than 2.0 inches and ii) the outer profile having no interference with an adjacent receptacle of the power source located on all sides of the first receptacle when a like charger plug is mounted in all available orientations in any of the other receptacles, so that when space is limited by an obstacle adjacent or in front of the power source the charger plug is capable of being conveniently mounted to one of the receptacles, the power cord plug end may be conveniently received by the DC connector and the power cord plug end can be conveniently removed from the DC connector while leaving the charger plug connected to the receptacle.]

[2. The charger plug of claim 1 wherein the charger plug face area has a perimeter that defines generally one of a polygonal, squared-off circle, ovoid or circular shape and the receptacle face area has a periphery that defines generally one of a polygonal, squared-off circle, ovoid or circular shape.]

[3. The charger plug of claim 2 wherein the perimeter of the charger plug defines a footprint that is not the same shape as the periphery of the receptacle.]

[4. The charger plug of claim 2 wherein the periphery of the receptacle surrounds less than all sides of a group of the receptacles.]

[5. The charger plug of claim 4 wherein the power source comprises a receptacle having two or three groups of receptacle openings disposed in a single continuous plate comprising the first and second receptacles.]

[6. The charger plug of claim 1 wherein the power source comprises four receptacles disposed in the wall outlet.]

[7. The charger plug of claim 1 wherein the power source includes three receptacle openings disposed in each of the first, second and third receptacles.]

[8. The charger plug of claim 1, further comprising the housing having a tapered portion at a rear end thereof, the tapered portion having an opening, and the connector being accessible through the tapered portion opening.]

[9. The charger plug of claim 1, further comprising a supporting substrate on which internal circuitry for converting power is mounted, the supporting substrate being a board extending in a lateral direction relative to the prong portions, and the housing has a shape to provide a tactile indication of an orientation of the connector.]

[10. The charger plug of claim 1 wherein the housing forms an outer profile having a longitudinal length of the housing outer profile being less than approximately 2.0 inches and a width of the housing outer profile being less than approximately 1.7 inches.]

[11. The charger plug of claim 1, wherein the connector is USB receptacle.]

[12. The charger plug of claim 1, wherein the aperture of the connector for receiving the power cord plug end has an insertion depth that is less than an insertion depth of the receptacle of the power source, the insertion depth of the receptacle being defined by the blade members of the charger plug being measured between an exit point where the blade member exits the housing and a terminal point on the blade member furthest from the exit point, so that the power cord plug end can be conveniently removed in a small space leaving the charger plug connected to the receptacle.]

[13. The charger plug of claim 1 wherein the connector is positioned on the housing so that a second direction of insertion of the connector aperture is substantially in-line with the first direction of the blade members of the charger plug to provide a shorter travel path for inserting and removing the power cord plug end when space is limited by an adjacent obstacle.]

[14. The charger plug of claim 1 wherein the charger plug includes a rear end on a side opposite the front wall and the connector is positioned on the housing so that a second direction of insertion of the connector aperture is substantially perpendicular with the first direction of the blade members of the charger plug to provide a shorter travel path for inserting and removing the power cord plug end when space is limited by an obstacle adjacent the rear end of the charger plug.]

[15. The charger plug of claim 1, wherein the power source comprises a power strip having multiple receptacles aligned side by side along the power strip.]

[16. The charger plug of claim 1, wherein the power source comprises a wall outlet.]

[17. The charger plug of claim 1, wherein the charger plug includes the DC connector oriented in order to provide a first removal force to remove the power cord plug end from the DC connector that is less than a second removal force to remove the blade members from the receptacle openings of the power source.]

[18. The charger plug of claim 1, wherein the DC connector has an aperture adapted for removably receiving a corresponding power cord plug end for transmitting DC power to the electronic device, the power cord plug end insertable within the aperture along a second longitudinal insertion axis of the connector aperture that is substantially in-line with the first direction.]

[19. The charger plug of claim 1, wherein the blade members are non-movably mounted to the housing.]

*20. A charger plug capable of connecting with a two or three receptacle power source to convert l20V input power received from the power source to DC output power, the charger plug being electricallv connectable to a rechargeable electronic device via a power cord for providing the DC output power thereto, the charger plug including a housing, the charger plug comprising:*

*first and second separate blade members non-movably secured within the housing so as to have prong portions of the blade members positioned in order to extend in a first direction from a front wall of the housing, the prong portions adapted to be received in the receptacle openings of the power source;*

*the charger plug including a DC connector having an aperture adapted to removablv receive a corresponding power cord plug end for transmitting DC power to the rechargeable electronic device;*

*the charger plug housing forming a) a charger plug face area defined by the front wall b) an outer profile defined by a perimeter of the front wall and defined by a plug body extending rearward from the front wall and c) a rear end opposite the front wall;*

*a printed circuit board located within the housing and haying the DC connector mounted thereon, wherein a rearward extent of the blade members ends before a front edge of the printed circuit board and the housing has a connector opening at the rear end for proyiding access to the DC connector aperture by the power cord plug;*

*the charger plug configured to be capable of plugging into a standard wall outlet and further:*

*i) being sized so that the charger plug housing comprises a longitudinal length extending between the front wall and the rear end and the longitudinal length is less than 2.0 inches and*

*ii) the outer profile haying no interference with an adiacent receptacle of the power source located on all sides of the first receptacle when a like charger plug is mounted in all ayailable orientations in any of the other receptacles,*

*so that when space is limited by an obstacle adiacent or in front of the power source the charger plug is capable of being conveniently mounted to one of the receptacles, the power cord plug end may be conveniently received by the DC connector and the power cord plug*

*end can be conveniently removed from the DC connector while leaving the charger plug connected to the receptacle.*

*21. A charger plug capable of connecting with a two or three receptacle power source to conyert 120V input power receiyed from the power source to DC output power, the charger plug being electrically connectable to a rechargeable electronic deyice yia a power cord for providing the DC output power thereto, the charger plug including a housing, the charger plug comprising:*

*first and second separate blade members secured within the housing so as to have prong portions of the blade members positioned in order to extend in a first direction from a front wall of the housing, the prong portions adapted to be received in the receptacle openings of the power source;*

*the charger plug including a DC connector having an aperture adapted to removablv receive a corresponding power cord plug end for transmitting DC power to the rechargeable electronic device;*

*the charger plug housing forming a) a charger plug face area defined bv the front wall b) an outer profile defined bv a perimeter of the front wall and defined bv a plug bodv extending rearward from the front wall and c) a rear end opposite the front wall;*

*a printed circuit board located within the housing and having the DC connector mounted thereon. the housing having a connector opening at the rear end for providing access to the DC connector aperture by the power cord plug;*

*spring contacts electricallv connected to the blade members. wherein the spring contacts are elastically deformed bv respective blade members to provide an elastic contacting force on the printed circuit board electrically connecting it to the blade members, each said blade member having a forwardmost portion in contact with the inside of the housing front wall and a rearmost portion in contact with a respective spring contact in front of the printed circuit board;*

*the charger plug configured to be capable of plugging into a standard wall outlet and further:*

*i) being sized so that the charger plug housing comprises a longitudinal length extending between the front wall and the rear end and the longitudinal length is less than 2.0 inches and*

*ii) the outer profile having no interference with an adiacent receptacle of the power source located on all sides of the first receptacle when a like charger plug is mounted in all available orientations in any of the other receptacles.*

*so that when space is limited by an obstacle adiacent or in front of the power source the charger plug is capable of being conveniently mounted to one of the receptacles, the power cord plug end may be conveniently received by the DC connector and the power cord plug end can be conveniently removed from the DC connector while leaving the charger plug connected to the receptacle.*

*22. A charger plug capable of connecting with a two or three receptacle power source to convert 120V input power received from the power source to DC output power, the charger plug being electrically connectable to a rechargeable electronic device via a power cord for providing the DC output power thereto. the charger plug including a housing, the charger plug comprising:*

*first and second separate blade members secured within the housing so as to have prong portions of the blade members positioned in order to extend in a first direction from a front wall of the housing, the prong portions adapted to be received in the receptacle openings of the power source;*

*the charger plug including a DC connector having an aperture adapted to removably receive a corresponding power cord plug end for transmitting DC power to the rechargeable electronic device;*

*the charger plug housing forming a) a charger plug face area defined by the front wall b) an outer profile defined by a perimeter of the front wall and defined by a plug body extending rearward from the front wall and c) a rear end opposite the front wall;*

*a printed circuit board located within the housing and haying the DC connector mounted thereon, the housing haying a connector opening at the rear end for providing access to the DC connector aperture by the power cord plug;*

*the charger plug configured to be capable of plugging into a standard wall outlet and further:*

*i) being sized so that the charger plug housing comprises a longitudinal length extending between the front wall and the rear end and the longitudinal length is less than 2.0 inches and comprises an outer profile haying a width less than 1. 75 inches, and*

*ii) the outer profile having no interference with an adjacent receptacle of the power source located on all sides of the first receptacle when a like charger plug is mounted in all available orientations in any of the other receptacles,*

*so that when space is limited by an obstacle adjacent or in front of the power source the charger plug is capable of being conveniently mounted to one of the receptacles, the power cord plug end may be conveniently received by the DC connector and the power cord plug end can be conveniently removed from the DC connector while leaving the charger plug connected to the receptacle.*

*23. A charger plug capable of connecting with a two or three receptacle power source to convert 120V input power received from the power source to DC output power, the charger plug being electrically connectable to a rechargeable electronic device via a power cord for providing the DC output power thereto, the charger plug including a housing, the charger plug comprising:*

*first and second separate blade members non-movably secured within the housing so as to have prong portions of the blade members positioned in order to extend in a first direction from openings through a front wall of the housing, the prong portions adapted to be received in the receptacle openings of the power source:*

*the charger plug including a DC connector having an aperture adapted to removably receive a corresponding power cord plug end for transmitting DC power to the rechargeable electronic device:*

*the charger plug housing forming a) a charger plug face area defined by the front wall b) an outer profile defined by a perimeter of the front wall and defined by a plug body extending rearward from the front wall and c) a rear end opposite the front wall;*

*a printed circuit board located within the housing and having a front end adiacent the inside of the front wall;*

*the charger plug configured to be capable of plugging into a standard wall outlet and further:*

*i) being sized so that the charger plug housing comprises a longitudinal length extending between the front wall and the rear end and the longitudinal length is less than 2.0 inches and*

*ii) the outer profile having no interference with an adjacent receptacle of the power source located on all sides of the first receptacle when a like charger plug is mounted in all available orientations in any of the other receptacles,*

*so that when space is limited by an obstacle adjacent or in front of the power source the charger plug is capable of being conveniently mounted to one of the receptacles, the power cord plug end may be conveniently received by the DC connector and the power cord plug end can be conveniently removed from the DC connector while leaving the charger plug connected to the receptacle and*

*(iii) having permanent spring-loaded electrical connections between the non-movable blade members and the front end of the printed circuit board.*

*24. The charger plug of claim 23, further comprising first and second spring contacts elastically deformed by respective first and second blade members spaced in the longitudinal direction from a front edge of said printed circuit board.*

*25. The charger plug of claim 23, wherein the spring contacts are elastically deformed by respective blade members. each said blade member having a forwardmost portion in contact with the inside of the housing front wall and a rearmost portion in contact with a respective spring contact in front of the printed circuit board.*

*26. The charger plug of claim 23, wherein the spring-loaded electrical connections are made by spring contacts that connect electrically to the printed circuit board and the blade members without being soldered to either.*

*27. The charger plug of claim 23, wherein the rearward extent of the blade members ends before a front edge of the printed circuit board.*

*28. The charger plug of claim 23, wherein:*

*the DC connector is mounted on a surface of the printed circuit board at a location within the charger plug housing;*

*the charging plug housing has a connector opening at the rear end for providing access to the DC connector aperture by the power cord plug; and*

*the power cord plug end is insertable within the DC connector aperture along a second longitudinal insertion axis of the connector aperture that is substantially in-line with the first direction.*

*29. The charger plug of claim 23, wherein the charger plug housing exterior includes indicia with information relating to requirements of applicable regulatory bodies.*

*30. A charger plug capable of connecting with a two or three receptacle power source to convert 120V AC input power received from the power source to DC output power, the charger plug being electrically connectable to a rechargeable electronic device via a power cord for providing the DC output power thereto. the charger plug including a housing, the charger plug comprising:*

*first and second separate blade members secured within the housing so as to have prong portions of the blade members positioned in order to extend in a first direction from a front wall of the housing, the prong portions adapted to be received in the receptacle openings of the power source;*

*the charger plug including a DC connector having an aperture adapted to removably receive a corresponding power cord plug end for transmitting DC power to the rechargeable electronic device and converter circuitry mounted on a printed circuit board located within the housing for converting the AC input power to the DC output power;*

*the charger plug housing forming a) a charger plug face area defined by the front wall b) an outer profile defined by a perimeter of the front wall and defined by a plug body extending rearward from the front wall and c) a rear end opposite the front wall;*

*the charger plug configured to be capable of plugging into a standard wall outlet and further:*

*i) being sized so that the charger plug housing comprises a longitudinal length extending between the front wall and the rear end and the longitudinal length is less than 2.0 inches, a width of the housing outer profile being less than 1.75 inches, and*

*ii) the outer profile having no interference with an adjacent receptacle of the power source located on all sides of the first receptacle when a like charger plug is mounted in all available orientations in any of the other receptacles,*

*so that when space is limited by an obstacle adjacent or in front of the power source the charger plug is capable of being conveniently mounted to one of the receptacles, the power cord plug end may be conveniently received by the DC connector and the power cord plug end can be conveniently removed from the DC connector while leaving the charger plug connected to the receptacle and*

*(iii) the charger plug housing exterior including indicia with information relating to requirements of applicable regulatory bodies.*

*31. The charger plug of claim 30, wherein the indicia are imprinted on the charger plug face area.*

*32. The charger plug of claim 31, wherein the indicia are imprinted on a label comprising a front face of the charger plug housing.*

*33. The charger plug of claim 30, wherein the blade members make permanent spring-loaded electrical connections with the printed circuit board by spring contacts that connect electrically to the printed circuit board and the blade members without being soldered to either.*

*34. The charger plug of claim 33, wherein respective first and second spring contacts are elastically deformed by respective first and second blade members, each said blade member having a forwardmost portion in contact with the inside of the housing front wall and a rearmost portion in contact with a respective spring contact in front of the printed circuit board.*

*35. The charger plug of claim 30, wherein the rearward extent of the blade members ends before a front edge of the printed circuit board.*

*36. A charger plug capable of connecting with a two or three receptacle power source to convert 120V AC input power received from the power source to DC output power, the charger plug being electrically connectable to a rechargeable electronic device via a power cord for providing the DC output power thereto. the charger plug including a housing, the charger plug comprising:*

*first and second separate blade members non-movably secured within the housing so as to have prong portions of the blade members positioned in order to extend in a first direction from openings through a front wall of the housing, the prong portions adapted to be received in the receptacle openings of the power source;*

*the charger plug including a DC connector having an aperture adapted to removably receive a corresponding power cord plug end for transmitting DC power to the rechargeable electronic device and converter circuitry mounted on a printed circuit board located within the housing for converting the AC input power to the DC output power;*

*the charger plug housing forming a) a charger plug face area defined by the front wall b) an outer profile defined by a perimeter of the front wall and defined by a plug body extending rearward from the front wall and c) a rear end opposite the front wall. the printed circuit board having a front end adjacent the inside of the front wall;*

*the charger plug configured to be capable of plugging into a standard wall outlet and further:*

*i) being sized so that the charger plug housing comprises a longitudinal length extending between the front wall and the rear end and the longitudinal length is less than 2.0 inches, a width of the housing outer profile being less than 1.75 inches, and*

*ii) the outer profile having no interference with an adjacent receptacle of the power source located on all sides of the first receptacle when a like charger plug is mounted in all available orientations in any of the other receptacles,*

*so that when space is limited by an obstacle adjacent or in front of the power source the charger plug is capable of being conveniently mounted to one of the receptacles, the power cord plug end may be conveniently received by the DC connector and the power cord plug end can be conveniently removed from the DC connector while leaving the charger plug connected to the receptacle and*

*(iii) having permanent spring-loaded electrical connections between the non-movable blade members and a front end of the printed circuit board.*

*37. The charger plug of claim 36, wherein:*

*the DC connector is mounted on a surface of the printed circuit board at a location within the charger plug housing;*

*the charger plug housing has a connector opening at the rear end for providing access to the DC connector aperture by the power cord plug; and*

*the power cord plug end is insertable within the DC connector aperture along a second longitudinal insertion axis of the connector aperture that is substantially in-line with the first direction.*

*38. The charger plug of claim 36, wherein the permanent spring-loaded electrical connections are made by spring contacts that connect electrically to the printed circuit board and the blade members without being soldered to either.*

*39. The charger plug of claim 38, wherein first and second spring contacts are elastically deformed by respective first and second blade members, each said blade member having a forwardmost extent in contact with the inside of the housing front wall and a rearmost extent in contact with a respective spring contact in front of the printed circuit board.*

*40. The charger plug of claim 36, wherein the rearward extent of the blade members ends before a front edge of the printed circuit board.*

*41. The charger plug of claim 36, wherein the charger plug housing exterior includes indicia with information relating to requirements of applicable regulatory bodies.*

* * * * *